US008346781B1

(12) United States Patent
 Cornelius

(10) Patent No.: US 8,346,781 B1
(45) Date of Patent: Jan. 1, 2013

(54) DYNAMIC CONTENT DISTRIBUTION SYSTEM AND METHODS

(76) Inventor: Jayson Holliewood Cornelius, Oviedo, FL (US)

( * ) Notice: Subject to any disclaimer, the term of this patent is extended or adjusted under 35 U.S.C. 154(b) by 116 days.

(21) Appl. No.: 12/907,020

(22) Filed: Oct. 18, 2010

(51) Int. Cl.
 *G06F 17/00* (2006.01)
(52) U.S. Cl. ........................................ 707/748; 434/353
(58) Field of Classification Search .................... 707/748
 See application file for complete search history.

(56) References Cited

U.S. PATENT DOCUMENTS

2006/0040247 A1* 2/2006 Templin ........................ 434/362

* cited by examiner

*Primary Examiner* — Belix M Ortiz Ditren
(74) *Attorney, Agent, or Firm* — The Patent Guild; Paul Royal

(57) ABSTRACT

A dynamic content distribution system and method that uses a unique Item Response Function IRF method to provide digital content to end-users based on psychometric reasoning. The system and method gathers psychometric attributes of Registered Users and Registered Subscribers and combines the psychometric attributes with Item Response Function methods, including characterizing content by corresponding psychometric attributes, to determine how and when digital content is presents to the Registered Users.

14 Claims, 24 Drawing Sheets

Psychometric Answer Database (400)

| | |
|---|---|
| PK,FK1,FK1 | RUSER_IDCODE |
| PK,FK1 | SURV_IDCODE |
| | first_name |
| | last_name |
| | birthdate |

Personality Answer Key (401)

| | |
|---|---|
| PK | RUSER_IDCODE |
| PK | PRSN_SINICode |
| | PRSN_ANS_1 |
| | PRSN_ANS_2 |
| | PRSN_ANS_3 |
| | PRSN_ANS_4 |
| | PRSN_ANS_5 |
| | PRSN_ANS_6 |
| | PRSN_ANS_7 |
| | PRSN_ANS_8 |

Abstract Reasoning (402)

| | |
|---|---|
| PK | RUSER_IDCODE |
| PK | ARA_SINICode |
| | ARA_ANS_1 |
| | ARA_ANS_2 |
| | ARA_ANS_3 |
| | ARA_ANS_4 |
| | ARA_ANS_5 |
| | ARA_ANS_6 |
| | ARA_ANS_7 |
| | ARA_ANS_8 |

Numerical Reasoning (403)

| | |
|---|---|
| PK | RUSER_IDCODE |
| PK | NRA_SINICode |
| | NRA_ANS_1 |
| | NRA_ANS_2 |
| | NRA_ANS_3 |
| | NRA_ANS_4 |
| | NRA_ANS_5 |
| | NRA_ANS_6 |
| | NRA_ANS_7 |
| | NRA_ANS_8 |

Verbal Reasoning (404)

| | |
|---|---|
| PK | RUSER_IDCODE |
| PK | VRA_SINICode |
| | VRA_ANS_1 |
| | VRA_ANS_2 |
| | VRA_ANS_3 |
| | VRA_ANS_4 |
| | VRA_ANS_5 |
| | VRA_ANS_6 |
| | VRA_ANS_7 |
| | VRA_ANS_8 |

Computer Skill Set (405)

| | |
|---|---|
| PK | RUSER_IDCODE |
| PK | CSA_SINICode |
| | CSA_ANS_1 |
| | CSA_ANS_2 |
| | CSA_ANS_3 |
| | CSA_ANS_4 |
| | CSA_ANS_5 |
| | CSA_ANS_6 |
| | CSA_ANS_7 |
| | CSA_ANS_8 |

Emotional Quotient (406)

| | |
|---|---|
| PK | RUSER_IDCODE |
| PK | EQA_SINICode |
| | EQA_ANS_1 |
| | EQA_ANS_2 |
| | EQA_ANS_3 |
| | EQA_ANS_4 |
| | EQA_ANS_5 |
| | EQA_ANS_6 |
| | EQA_ANS_7 |
| | EQA_ANS_8 |

Mechanical Reasoning (407)

| | |
|---|---|
| PK | RUSER_IDCODE |
| PK | MRA_SINICode |
| | MRA_ANS_1 |
| | MRA_ANS_2 |
| | MRA_ANS_3 |
| | MRA_ANS_4 |
| | MRA_ANS_5 |
| | MRA_ANS_6 |
| | MRA_ANS_7 |
| | MRA_ANS_8 |

Cognitive Survey (408)

| | |
|---|---|
| PK | RUSER_IDCODE |
| PK | COG_SINICode |
| | COG_ANS_1 |
| | COG_ANS_2 |
| | COG_ANS_3 |
| | COG_ANS_4 |
| | COG_ANS_5 |
| | COG_ANS_6 |
| | COG_ANS_7 |
| | COG_ANS_8 |

Intelligent Quotient (409)

| | |
|---|---|
| PK | RUSER_IDCODE |
| PK | PRSN_SINICode |
| | IQA_ANS_1 |
| | IQA_ANS_2 |
| | IQA_ANS_3 |
| | IQA_ANS_4 |
| | IQA_ANS_5 |
| | IQA_ANS_6 |
| | IQA_ANS_7 |
| | IQA_ANS_8 |

Spatial Ability (410)

| | |
|---|---|
| PK | RUSER_IDCODE |
| PK | SAA_SINICode |
| | SAA_ANS_1 |
| | SAA_ANS_2 |
| | SAA_ANS_3 |
| | SAA_ANS_4 |
| | SAA_ANS_5 |
| | SAA_ANS_6 |
| | SAA_ANS_7 |
| | SAA_ANS_8 |

SURV_DB_ANS (411)

| | |
|---|---|
| PK | SURV_IDCODE |
| PK | SURV_SINICODE |
| PK | RUSER_IDCODE |

Fig. 5

(500) SAM_DATABASE

| | |
|---|---|
| PK | SAMUSER_IDCODE |
| PK | SAMUSER_EMAIL |
| | SAMUSER_ACCOUNTTYPE |
| | SAMUSER_PASSWORD |
| | SAMUSER_COMPANY_NAME |
| | SAMUSER_CONTACT_FNAME |
| | SAMUSER_CONTACT_LNAME |
| | SAMUSER_AFFILIATEID |
| | SAMUSER_STREET_ADDRESS |
| | SAMUSER_CITY |
| | SAMUSER_STATE |
| | SAMUSER_ZIPCODE |

(501) SAMUSER_EXTENTED

| | |
|---|---|
| PK | SAMUSER_IDCODE |
| PK | SAMUSER_EXT |
| | SAMUSER_AGE_GROUP |
| | SAMUSER_GENDER |
| | SAMUSER_MARITAL |
| | SAMUSER_DEPENDENTS |
| | SAMUSER_RACE |
| | SAMUSER_EMPLOYMENT |
| | SAMUSER_EDUCATION |
| | SAMUSER_REGION |
| | SAMUSER_CITY |
| | SAMUSER_STATE |
| | SAMUSER_ZIPCODE |
| | SAMUSER_SPECIAL_INTEREST_1 |
| | SAMUSER_SPECIAL_INTEREST_2 |
| | SAMUSER_SPECIAL_INTEREST_3 |
| | SAMUSER_SPECIAL_INTEREST_4 |
| | SAMUSER_SPECIAL_INTEREST_5 |
| | SAMUSER_SPECIAL_INTEREST_6 |
| | SAMUSER_SPECIAL_INTEREST_7 |
| | SAMUSER_SPECIAL_INTEREST_8 |

(502) Content Personality Target

| | |
|---|---|
| PK | SAMUSER_IDCODE |
| PK | SAMUSER_TPRSN |
| | SAMUSER_ENFP |
| | SAMUSER_INFJ |
| | SAMUSER_ISTJ |
| | SAMUSER_ENTJ |
| | SAMUSER_INTP |
| | SAMUSER_ESFJ |
| | SAMUSER_ISFP |
| | SAMUSER_ENTP |
| | SAMUSER_INTJ |
| | SAMUSER_ESFP |
| | SAMUSER_ISFJ |
| | SAMUSER_ESTJ |
| | SAMUSER_ISTP |
| | SAMUSER_ENFJ |
| | SAMUSER_INFP |

(503) Content Psychometric Target

| | |
|---|---|
| PK | SAMUSER_IDCODE |
| PK | SAMUSER_ASINICODE |
| | SAMUSER_VRA(VAR) |
| | SAMUSER_SAA(VAR) |
| | SAMUSER_EQA(VAR) |
| | SAMUSER_NRA(VAR) |
| | SAMUSER_ARA(VAR) |
| | SAMUSER_MRA(VAR) |
| | SAMUSER_CSA(VAR) |
| | SAMUSER_IGA(VAR) |

(504) IRF_Repository

| | |
|---|---|
| PK | SAMUSER_IDCODE |
| PK | RUSER_IRFCODE |
| PK | RUSER_IDCODE |
| | RUSER_IRF(1) |
| | RUSER_IRF(2) |
| | RUSER_IRF(3) |
| | RUSER_IRF(4) |
| | RUSER_IRF(5) |
| | RUSER_IRF(6) |
| | RUSER_IRF(7) |
| | RUSER_IRF(8) |
| | RUSER_IRF(9) |
| | RUSER_IRF(10) |
| | RUSER_IRF(11) |
| | RUSER_IRF(12) |
| | RUSER_IRF(13) |
| | RUSER_IRF(14) |
| | RUSER_IRF(15) |
| | RUSER_IRF(16) |
| | RUSER_IRF(17) |
| | RUSER_IRF(18) |
| | RUSER_IRF(19) |
| | RUSER_IRF(20) |
| | RUSER_IRF(21) |
| | RUSER_IRF(22) |

(505) Dynamic_Content_Topology

| | |
|---|---|
| PK | SAMUSER_IDCODE |
| PK | SAMUSER_DCS_IDCODE |
| | SAMDCS_N100 |
| | SAMDCS_E100 |
| | SAMDCS_S100 |
| | SAMDCS_F100 |
| | SAMDCS_L100 |
| | SAMDCS_M100 |
| | SAMDCS_H100 |
| | SAMDCS_R100 |

(506) Dynamic_Video_Topology

| | |
|---|---|
| PK | SAMUSER_IDCODE |
| PK | SAMUSER_DVS_IDCODE |
| | SAMDVS_N100 |
| | SAMDVS_E100 |
| | SAMDVS_S100 |
| | SAMDVS_F100 |
| | SAMDVS_L100 |
| | SAMDVS_M100 |
| | SAMDVS_H100 |
| | SAMDVS_R100 |

(507) CAM ASSOCIATIONS

| | |
|---|---|
| PK | SAMUSER_IDCODE |
| PK | CAM_IDCODE |
| | CAM_AISS |

(508) RUSER ASSOCIATIONS

| | |
|---|---|
| PK | SAMUSER_IDCODE |
| PK | AISS_IDCODE |
| U1 | RUSER_AISS |

(509) SAM_AISS

| | |
|---|---|
| PK | SAMUSER_IDCODE |
| PK | SAMUSER_AISS |
| | SAMUSER_GRP1 |
| | SAMUSER_GRP2 |
| | SAMUSER_GRP3 |
| | SAMUSER_GRP4 |
| | SAMUSER_GRP5 |
| | SAMUSER_GRP6 |
| | SAMUSER_GRP7 |
| | SAMUSER_GRP8 |

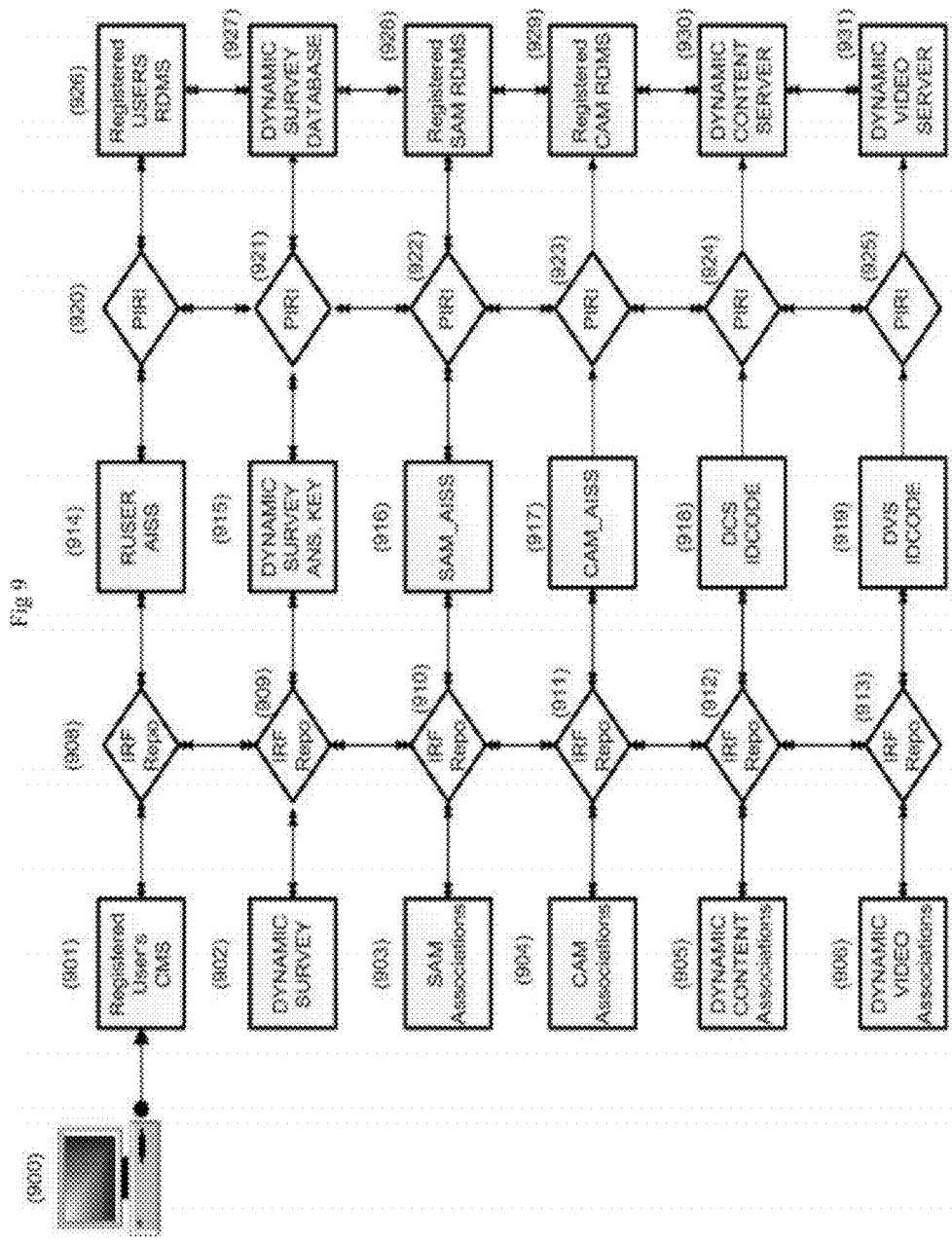

Fig. 10

(1000) Content Management System
- RUSER_IRFCODE
- RUSER_DCS_IDCODE
- SAMUSER_DCS_IDCODE
- CAMUSER_DCF_IDCODE
- CAMUSER_DCS_IDCODE
- DCSUSER_DCF_IDCODE
- DCSUSER_NXXX
- DCSUSER_EXXX
- DCSUSER_SXXX
- DCSUSER_FXXX
- DCSUSER_LXXX
- DCSUSER_MXXX
- DCSUSER_HXXX
- DCSUSER_RXXX
- DCSCLD(N)_CODE (1001) Registered SAM RDMS
- PK: RUSER_IRFCODE
- RUSER_DCS_IDCODE
- SAMUSER_DCS_IDCODE
- CAMUSER_DCF_IDCODE
- CAMUSER_DCS_IDCODE
- DCSUSER_DCF_IDCODE
- DCSUSER_NXXX
- DCSUSER_EXXX
- DCSUSER_SXXX
- DCSUSER_FXXX
- DCSUSER_LXXX
- DCSUSER_MXXX
- DCSUSER_HXXX
- DCSUSER_RXXX
- DCSCLD(N)_CODE (1002) Registered CAM RDMS
- PK: RUSER_IRFCODE
- RUSER_DCS_IDCODE
- SAMUSER_DCS_IDCODE
- CAMUSER_DCF_IDCODE
- CAMUSER_DCS_IDCODE
- DCSUSER_DCF_IDCODE
- DCSUSER_NXXX
- DCSUSER_EXXX
- DCSUSER_SXXX
- DCSUSER_FXXX
- DCSUSER_LXXX
- DCSUSER_MXXX
- DCSUSER_HXXX
- DCSUSER_RXXX
- DCSCLD(N)_CODE (1003) Dynamic Content Server
- PK: RUSER_IRFCODE
- RUSER_DCS_IDCODE
- SAMUSER_DCS_IDCODE
- CAMUSER_DCF_IDCODE
- CAMUSER_DCS_IDCODE
- DCSUSER_DCF_IDCODE
- DCSUSER_NXXX
- DCSUSER_EXXX
- DCSUSER_SXXX
- DCSUSER_FXXX
- DCSUSER_LXXX
- DCSUSER_MXXX
- DCSUSER_HXXX
- DCSUSER_RXXX
- DCSCLD(N)_CODE (1004) Video Management System
- RUSER_IRFCODE
- RUSER_DVS_IDCODE
- SAMUSER_DVS_IDCODE
- CAMUSER_DVF_IDCODE
- CAMUSER_DVS_IDCODE
- DVSUSER_DVS_IDCODE
- DVSUSER_NXXX
- DVSUSER_EXXX
- DVSUSER_SXXX
- DVSUSER_FXXX
- DVSUSER_LXXX
- DVSUSER_MXXX
- DVSUSER_HXXX
- DVSUSER_RXXX
- DVSLHOST_CODE
- DVSDPID_CODE (1005) Registered SAM RDMS
- PK: RUSER_IRFCODE
- RUSER_DVS_IDCODE
- SAMUSER_DVS_IDCODE
- CAMUSER_DVF_IDCODE
- CAMUSER_DVS_IDCODE
- DVSUSER_DVS_IDCODE
- DVSUSER_NXXX
- DVSUSER_EXXX
- DVSUSER_SXXX
- DVSUSER_FXXX
- DVSUSER_LXXX
- DVSUSER_MXXX
- DVSUSER_HXXX
- DVSUSER_RXXX
- DVSLHOST_CODE
- DVSDPID_CODE (1006) Registered CAM RDMS
- PK: RUSER_IRFCODE
- RUSER_DVS_IDCODE
- SAMUSER_DVS_IDCODE
- CAMUSER_DVF_IDCODE
- CAMUSER_DVS_IDCODE
- DVSUSER_DVS_IDCODE
- DVSUSER_NXXX
- DVSUSER_EXXX
- DVSUSER_SXXX
- DVSUSER_FXXX
- DVSUSER_LXXX
- DVSUSER_MXXX
- DVSUSER_HXXX
- DVSUSER_RXXX
- DVSLHOST_CODE
- DVSDPID_CODE (1007) Dynamic Video Server
- PK: RUSER_IRFCODE
- RUSER_DVS_IDCODE
- SAMUSER_DVS_IDCODE
- CAMUSER_DVF_IDCODE
- CAMUSER_DVS_IDCODE
- DVSUSER_DVS_IDCODE
- DVSUSER_NXXX
- DVSUSER_EXXX
- DVSUSER_SXXX
- DVSUSER_FXXX
- DVSUSER_LXXX
- DVSUSER_MXXX
- DVSUSER_HXXX
- DVSUSER_RXXX
- DVSLHOST_CODE
- DVSDPID_CODE

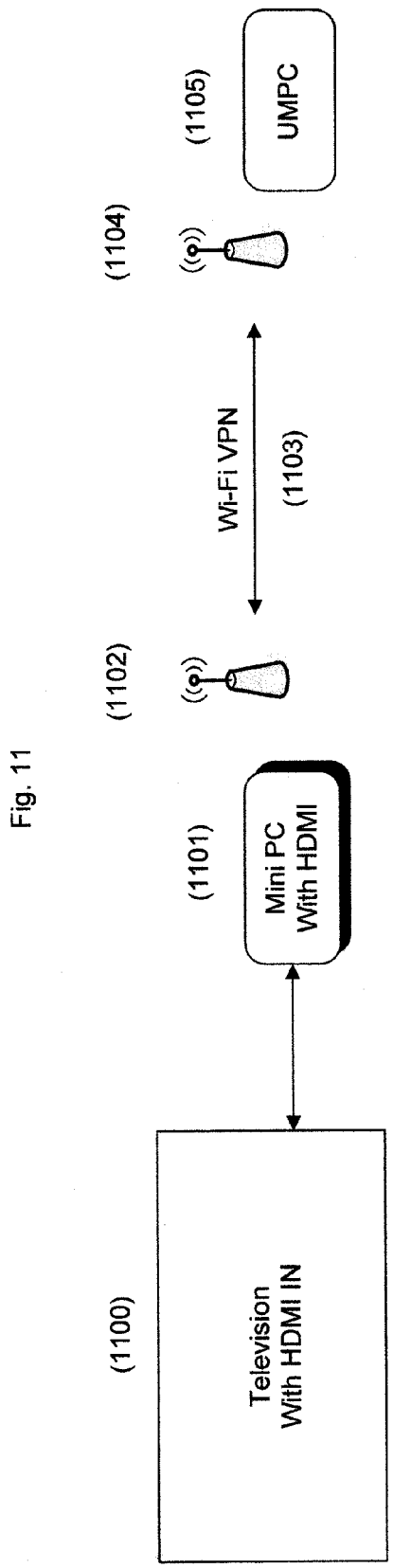

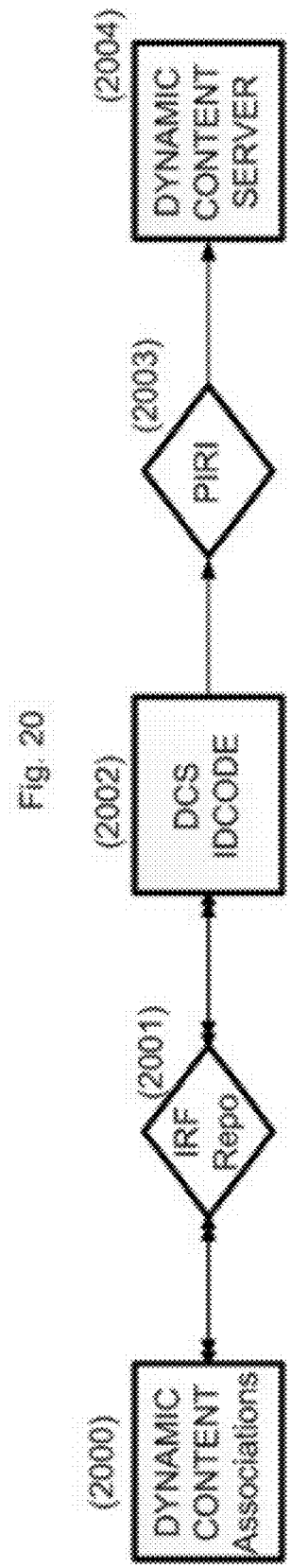

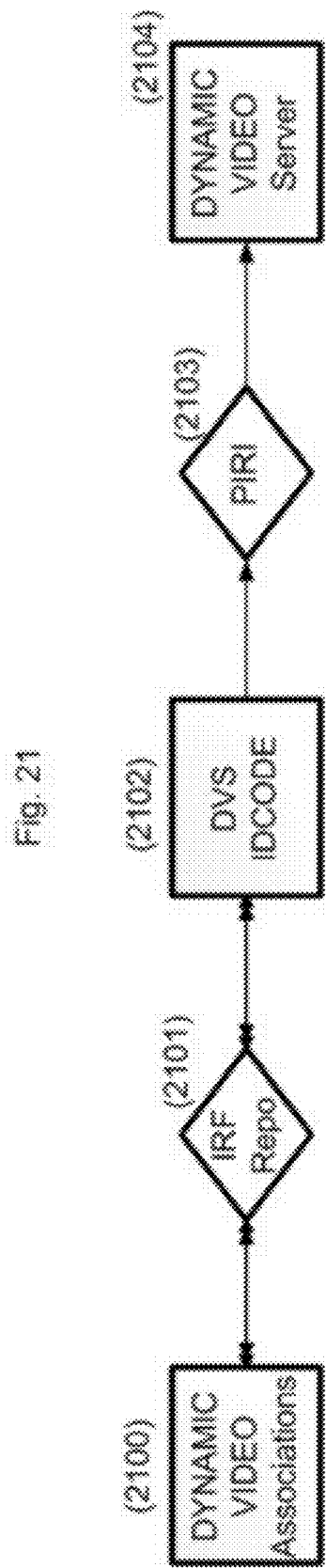

Personality (AISS) Alpha-Numerical Identification Sequential Score

| A | M | S | C | U | R | O | O | X | X | E | N | F | P | I | S | F | P | 5 | 6 | 6 | I | S | T | P | O | O | P | D |
|---|---|---|---|---|---|---|---|---|---|---|---|---|---|---|---|---|---|---|---|---|---|---|---|---|---|---|---|---|

| Group 1 | Group 2 | Group 3 | Group 4 | Group 5 | Group 6 | Group 7 |
|---------|---------|---------|---------|---------|---------|---------|

Group 1 = User Category (Based on Sex and Age Demographics) Adult Male or Female Married or Single-(Child or No Child)

Group 2 = UR – User Database Repository
Group 3 = Social Demographic Code
Group 4 = Primary Personality Trait -1
Group 5 = Secondary Personality Trait -2
Group 6 = Item Response Identification Code
Group 7 = User Registration Code ( UR – (alpha numerical) last registration code)

Fig. 22

DYNAMIC CONTENT DISTRIBUTION SYSTEM AND METHODS

FIELD OF THE INVENTION

The present invention relates generally to a dynamic content distribution system, and more particularly, relates to a dynamic content distribution system that uses a unique Item Response Function (IRF) method to provide digital content to end-users based on psychometric reasoning. More specifically, the instant invention gathers psychometric attributes of Registered Users and combines those psychometric attributes with Item Response Function methods to determine how and when digital content is presents to Registered Users.

BACKGROUND OF THE INVENTION

When users access the Internet, they use web browsers such as Microsoft Explorer, Mozilla, Firefox, or Google Chrome, among others. Usually the first page displayed when the web browser is started is called a home page. Users can designate any website as a home page, but typically Internet users, use search engine enabled websites for their home page such as "MSN.COM", "AOL.COM", and "GOOGLE.COM". Typically, these types of home pages have dynamic content feeds from several content providers and they feature advertisements from local or national advertisers. In most causes, the content that is featured on the home pages changes at some random interval to provide users with a variety of content from a variety of sources.

Entertainment related websites such as "MTV.COM", "BET.COM" and EntertainmentWeekly.com display entertainment related content, and display some form of advertisement. In over 90% of the websites listed on "PC Magazine's Top 100 Websites List" most have dynamic content and advertisements from internal and third party sources. Further, websites generally provide users with content pertaining to a wide array of subjects and these websites feature some form of advertisement. It is typical to see commercial videos, banners, sponsored links and advertisements from internet advertising sources like Google, Yahoo, and Bing, etc. featured on websites through out the internet.

Psychometrics is the field of study concerned with the theory and technique of educational and psychological measurement, which includes the measurement of knowledge, abilities, attitudes, and personality traits. The field is primarily concerned with the construction and validation of measurement instruments, such as questionnaires, tests, and personality assessments. It involves two major research tasks, namely: (i) the construction of instruments and procedures for measurement; and (ii) the development and refinement of theoretical approaches to measurement. The instant invention gathers psychometric attributes of Registered Users and combines those psychometric attributes with Item Response Function methods to determine how and when digital content is presents to Registered Users.

It would be desirable for websites to have an automatic content distribution system that use Item Response Functions (IRF) to measure Registered User's reactions to content that is suggested based on the Registered User's psychometric reasoning abilities.

It would also be desirable for advertisers and content providers to have an automatic content distribution system that use Item Response Functions (IRF) to measure end-user reactions to content that is suggested based on the Registered User's psychometric reasoning abilities.

It would also be desirable for affiliates that endorse content and advertisement to have an automatic content distribution system that use Item Response Functions (IRF) to measure the end-user reactions to the content that is suggested based on the Registered User's psychometric reasoning abilities.

It would be desirable for software application developers to have an automatic content distribution system that use Item Response Functions (IRF) to measure end-user reactions to content that is suggested based on the Registered User's psychometric reasoning abilities.

It would be desirable for end-user's to have digital content, advertisements and software solutions suggested to them based on their individualized psychometric attributes and reasoning abilities. In addition, the system may track the Registered User's attributes and provide feedback.

The present invention addresses these needs by providing a dynamic content distribution system that uses a unique Item Response Function (IRF) method to provide digital content to end-users based on psychometric reasoning.

BRIEF DESCRIPTION OF THE DRAWINGS

FIG. 3 presents exemplary tables of the Dynamic Survey relational database.

FIG. 4 presents exemplary tables of the Dynamic Survey Answer relational database.

FIG. 5 presents exemplary tables of the Registered SAM relational database.

FIG. 6 presents exemplary tables of the Registered CAM relational database.

FIG. 8 presents exemplary tables of the Dynamic Video Server relational database.

FIG. 9 presents a diagram of the operation of the PIRI INTELLIGENT API process.

FIG. 10 presents exemplary tables of the Content Management System.

FIG. 11 presents an example of the present invention installed directly on hardware.

FIG. 20 presents key Dynamic Content Associations process steps.

FIG. 21 presents key Dynamic Video Associations process steps.

FIG. 22 presents an Alpha-Numeric Identification Sequential Score (AIS Score).

SUMMARY OF THE INVENTION

Figure 1:
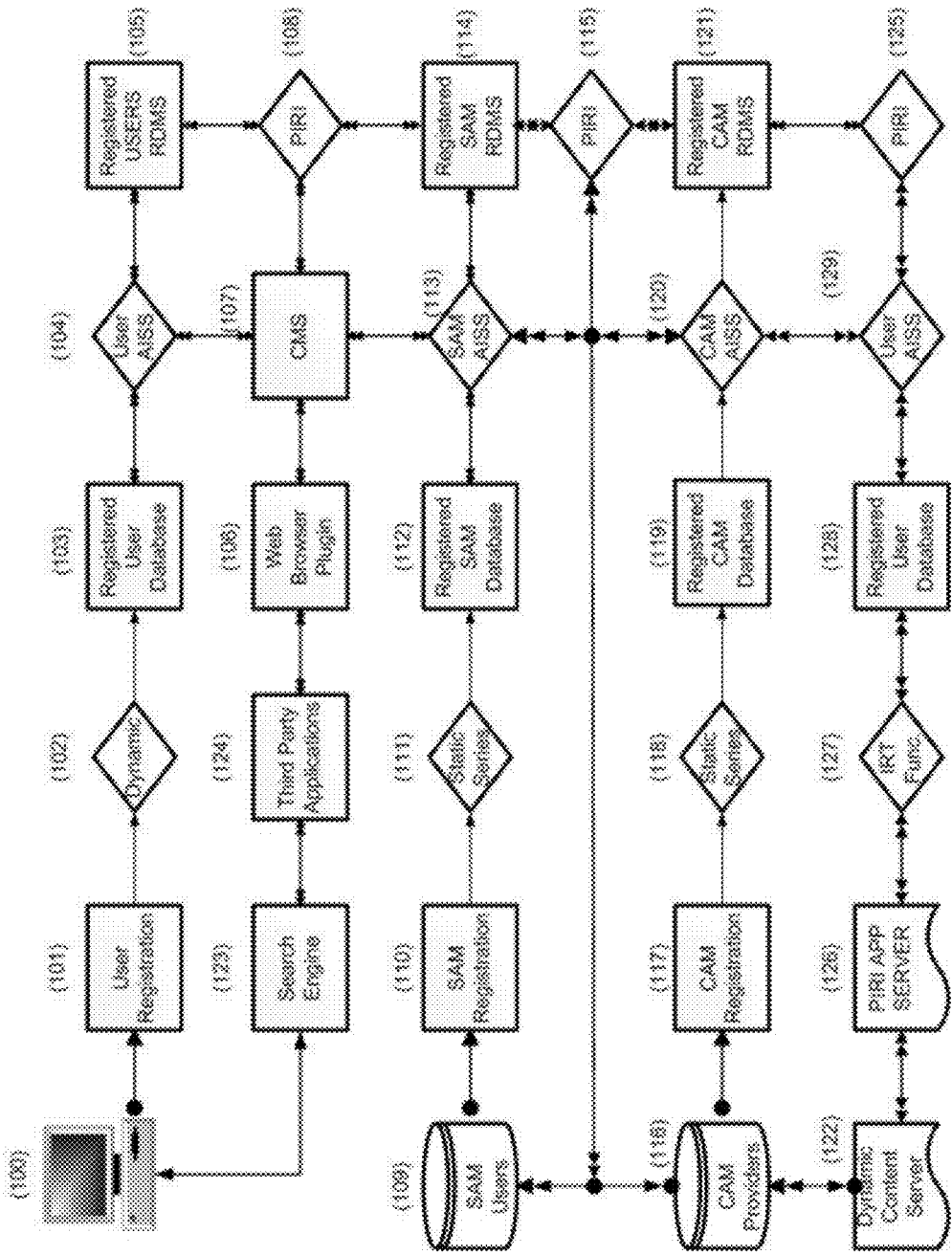
FIG. 1 presents a general diagram of the inventions Operation Model.

One embodiment of the present invention is an Internet Web Browser Plug-in Application that use Cloud Computing Applications and Item Response Functions (IRF) to suggest specific content to Internet Users based on their Psychometric Reasoning Abilities. The content is suggested in the following manners. The Registered User completes a registration survey, the answers to the survey is scored and the results are stored in the Registered User's profile. The survey scores and other information contained in the Registered User's profile is used to suggest Internet Content that is relevant to the Registered User's psychometric attributes based at least in part on an Alpha-Numeric Identification Sequential Score (AIS Score or AISS).

During registration of the Plug-in Application Registered Users are required to complete a dynamic series of psychometric questions. The answers to the questions are scored using a specially created answer key that use Item Response Functions (IRF) to identify the Registered User's personality, interests, aptitude, and abilities. After completing the questions; before the application is fully rendered, the Registered User is provided with personalized content choices that matches the Registered User's psychometric attributes. After the Registered User selects the recommended content, the homepage is created and populated with the individualized content and the installation is completed.

The Registered User psychometric attributes are stored in the Registered Users Database and an identification code called an Alpha-Numeric Identification Sequential Score (AIS Score or AISS) is created for each Registered User. The Registered User's AIS Score data is accessed, stored and processed by a Relational Database Management System (RDBMS). A processing application called the PIRI INTELLIGENT API monitors the Registered User's AIS Score data and the Registered User's actions to the content that is suggested. The PIRI INTELLIGENT API uses an algorithm derived from Item Response Function (IRF) equation to process the interactions of the User Psychometrical AIS Score with MetaData Elements called MetaDerms(s).

A MetaDerm is a specially derived identification code used, by the PIRI INTELLIGENT API to suggest content that is relevant to the end users Psychometric Attributes. The System uses two types of MetaDerms. Subscriber Assigned MetaDerms (SAM) which are dynamic with reciprocal features and Content Assigned MetaDerms (CAM) which are transient with compensating features.

Registration is required to become a Registered SAM Affiliate (also referred to herein as a SAM User) and receive a SAM AIS Score. SAM Users are required to complete a registration form that has static series of psychometric questions and additional information about the SAM User's target market attributes. The answers to the questions are scored using a specially created Answer Key Database that is used to identify which Register User's match the types of personalities, interests, aptitudes, and abilities that the Subscriber compliments. After completing the registration, a SAM AIS Score is created and the number is registered with the local SAM MetaData Registry and/or to a remote MetaData Registry.

Registration is required to receive a CAM AIS Score. CAM Users are required to complete a static series of psychometric questions. The answers to the questions are scored using a specially created Answer Key Database that is used to identify which Register User's match the types of personalities, interests, aptitudes, and abilities that the Content compliments. After completing the registration, a CAM AIS Score is created and the number is registered with a local CAM MetaData Registry and/or to a remote MetaData Registry.

The PIRI INTELLIGENT API Processes the Personality AIS Score, the SAM AIS Score and CAM AIS Score and use the data from of the respecting MetaData Registries to determine how content is displayed; to whom the content is displayed; what type of content that is displayed; when and why particular content is displayed.

Additional embodiment of the present invention, which is an automatic Content Distribution System maybe registered and used with third parties such as cloud applications, applications made by third parties using the PIRI Intelligent API, search engines such as Yahoo, Bing, and Google, and alternative browser in addition to Microsoft Explorer, such as Firefox, Safari and Google Chrome.

The Web Browser Plug-in Application is platform independent and may be installed on any Web Browser Application that allow plug-ins. Typically, Web Browser Plug-in's are programmed using the Application Programming Interface (API) provided by the developer of the Web Browser. In particular the Plug-In Application is programmed to send and receive MetaData information from remote MetaData Registries (such as a SAM MetaData Registry or a CAM MetaData Registry). The MetaData Registry stores the definitions of the MetaData that the Web Plug-in use to determine how content is displayed; to whom the content is displayed; what type of content that is displayed; when and why particular content is displayed.

The application may be installed on any Computer Enabled Device that access the internet using Internet Browsers; these may include Wireless Smart Phones, Ultra Mobile Personal Computers (UMPC), Smart Residential Phones, Digital Cable Boxes, IPTV Appliances, Handheld Devices, Personal & Notebook Computers, Satellite Radio devices, Home Automation devices, just to name a few.

The Web Browser Plug-in may be installed as a Plug-In Application using a set of software components in compliance with the Web Browser (API) standards. Further, using the methods explained in the this patent, the Plug-in Application may also be developed as an independent software application. The Web Browser Plug-in Application may be installed using an online repository that allows Registered Users to download and install the software Plug-in Application or by using media such as CDROM, DVDROM, USB Drives, and similar storage collectively referred to as Media.

DETAILED DESCRIPTION

The following will explain the Methods for creating a Dynamic Content Distribution System for Computer Enabled Devices.

Installation

FIG. 1 depicts the preferred embodiment if the instant invention and the installation of the software and interconnections of the Registered User registration data, Subscriber Assigned MetaDerm (SAM) system, Content Assigned MetaDerm (CAM) system, and the Dynamic Content Server. Further FIG. 1 depicts methods wherein the Dynamic Content Server dynamically distributes video content.

Figure 12:
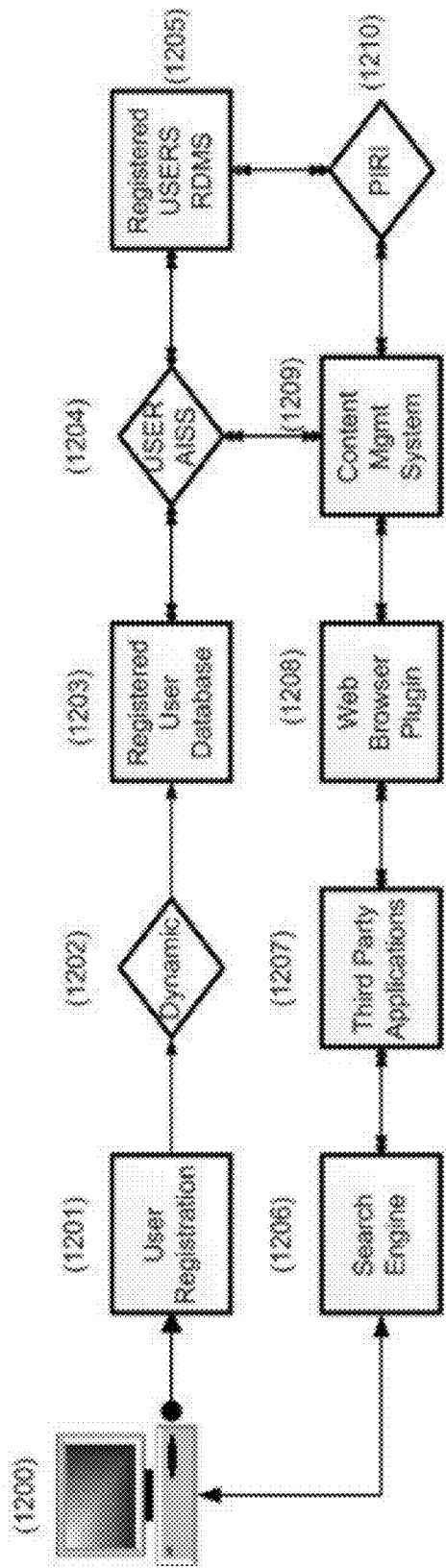
FIG. 12 presents a diagram of the Registered User registration process.
Figure 13:
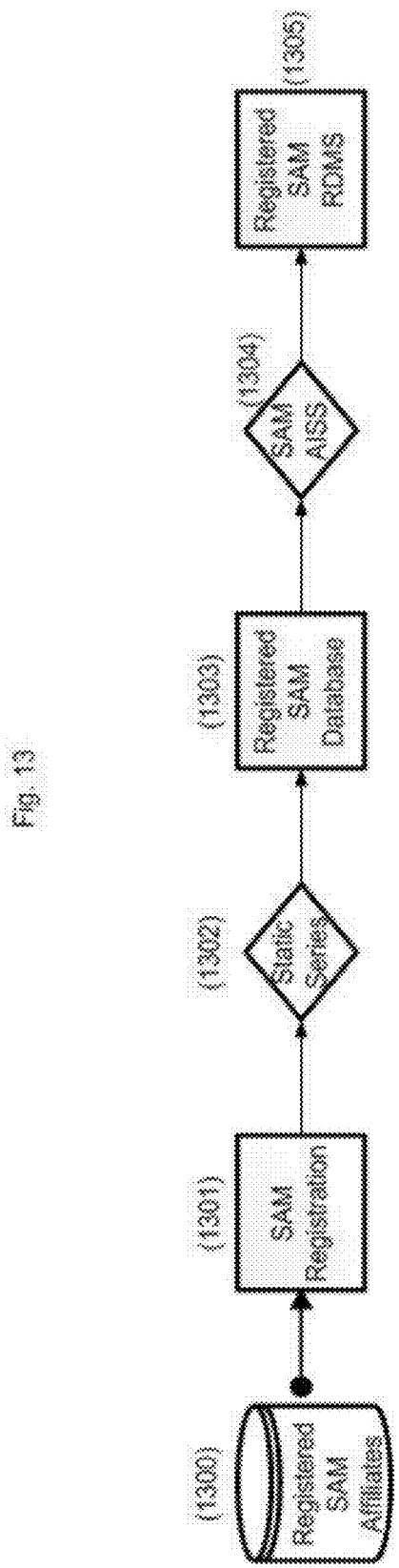
FIG. 13 presents a diagram of the Registered SAM Affiliate registration process.
Figure 14:
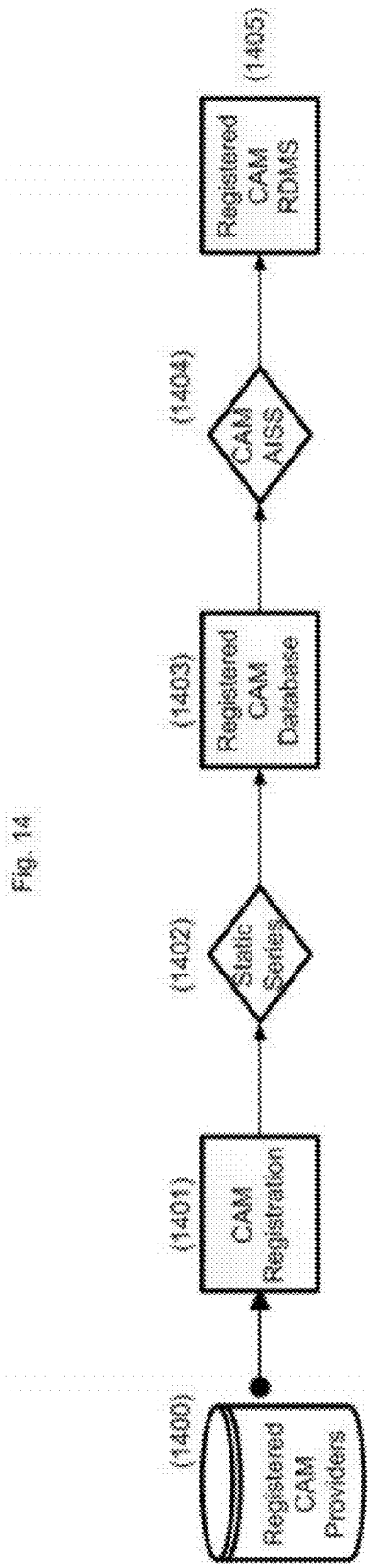
FIG. 14 presents a diagram of the Registered CAM Provider registration process.
Figure 15:
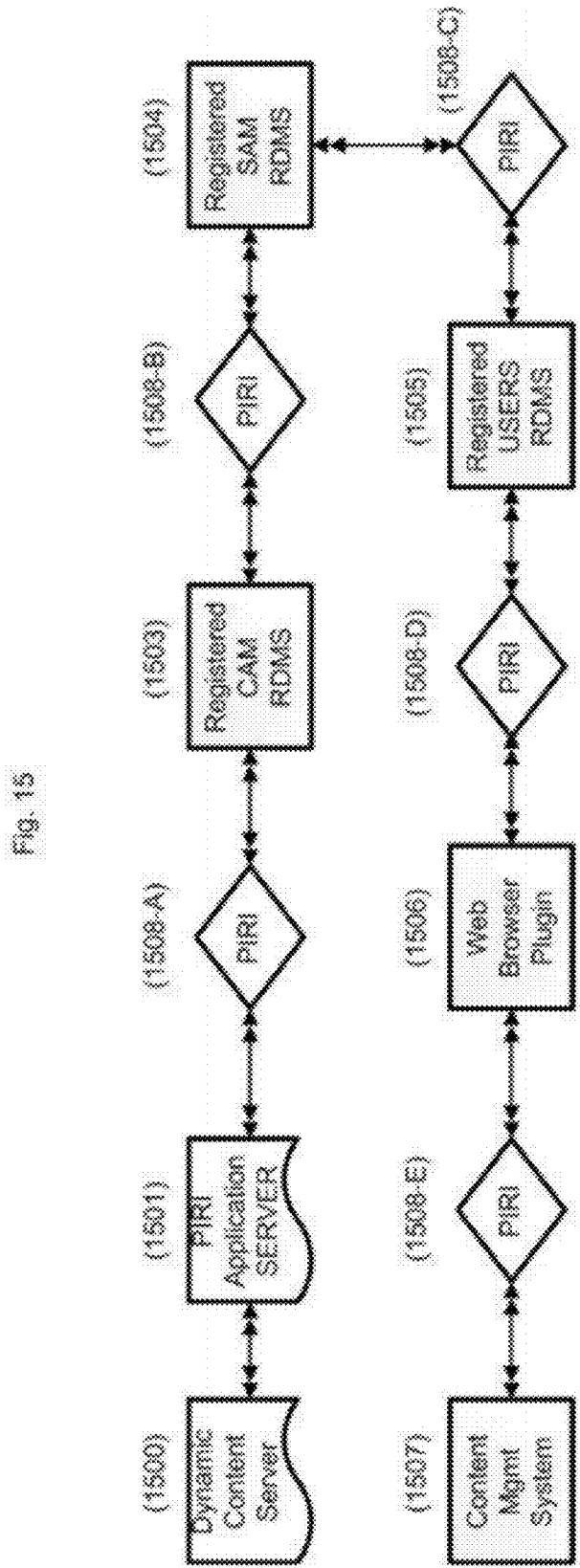
FIG. 15 presents a diagram dynamic content flow.

The diagram of FIG. 1 is broken into 5 functional groups (general Registered User registration—see also FIG. 12, SAM registration—see also FIG. 13, CAM registration—see also FIG. 14, Dynamic Content Server operation—see also FIG. 15, Relational Database Management System functions—presented in conjunction with the usage).

FIG. 1 further includes examples of how the software application can be installed using 3 different installment embodiments. Installation Embodiment 1 (123) represents the installation, integration, and use of the instant invention with a search engine, Installation Embodiment 2 (124) represents the installation, integration, and use of the instant invention with third party applications, and Installation Embodiment 1 (106) represents the installation, integration, and use of the instant invention with generally known Web Browser Plug-ins. Each of the indicated Installation Embodiments can be installed generally using the method and steps described below.

Registered User Registration

The Registered User is generally represented in conjunction with the computer device (100). The computer device can be any of type device which provides for data input as further indicated herein including a personal computer (PC), a Mini-PC, a mobile computing device, a smart phone, a networked electronic appliance, or a wireless computing device.

Figure 2:
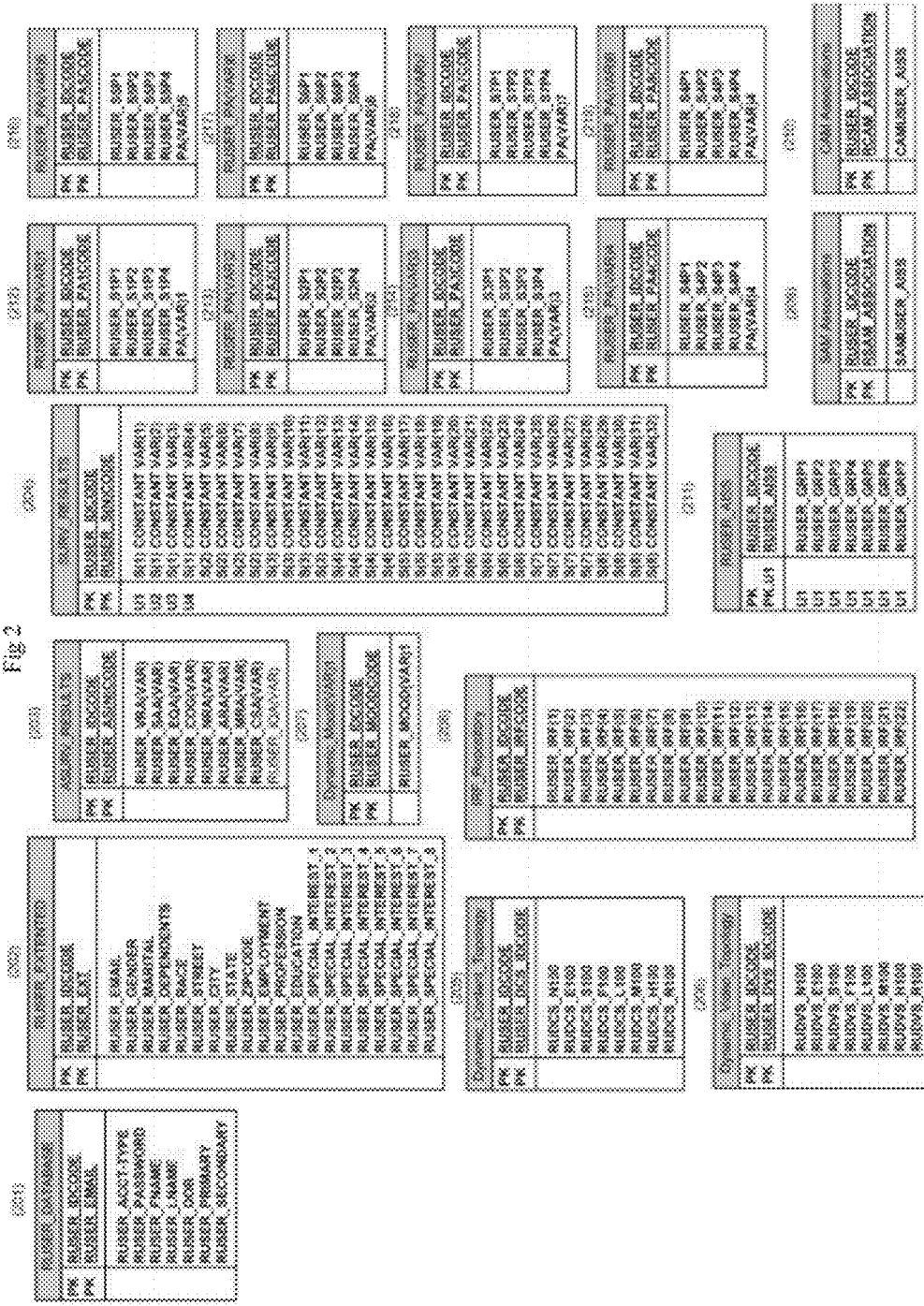
FIG. 2 presents exemplary tables of the Registered User's relational database.

During installation of the dynamic content distribution system, the Registered User enters the required Registered User profile information (such as name, date of birth, address, profession, education, password, etc) into the Registered User databases (201) and (202) as shown in FIG. 2. After the Registered User's profile information is entered, the Survey Database (300) processes and selects the appropriate personality survey based on the Registered User information provided.

The specific user personality survey(s) (300), also referred to as the Dynamic Series Survey (102), which is presented to the Registered User is selected from a predetermined group of surveys, or a unique survey can be developed using known database scripting and querying techniques. See FIG. 3 and FIG. 4 for exemplary survey tables and data fields.

As explained further herein, a key novelty of the present invention is that the survey(s) are selected to extract psychometric attributes of the Registered User and further, the surveys are selected for use in a unique Item Response Function methodology in conjunction with a distinctive application interface program called a PIRI INTELLIGENT API (108), (also referred to as PIRI Suggestive Operators 108, 115, and 125) wherein the PIRI INTELLIGENT API monitors the Registered User's survey responses and continually monitors the Registered User's reactions to content that is suggested to the Registered User.

FIG. 1 depicts that during Registered User Registration a Dynamic survey Series (102) is selected for the Registered User and presented for completion by the Registered User. Note—a graphical user interface display (not shown here) selectively presents the appropriate data and data fields onto the computer device 100 to prompt the Registered User to complete the applicable survey(s) wherein the Registered User responses are entered into the applicable database tables.

Figure 16:
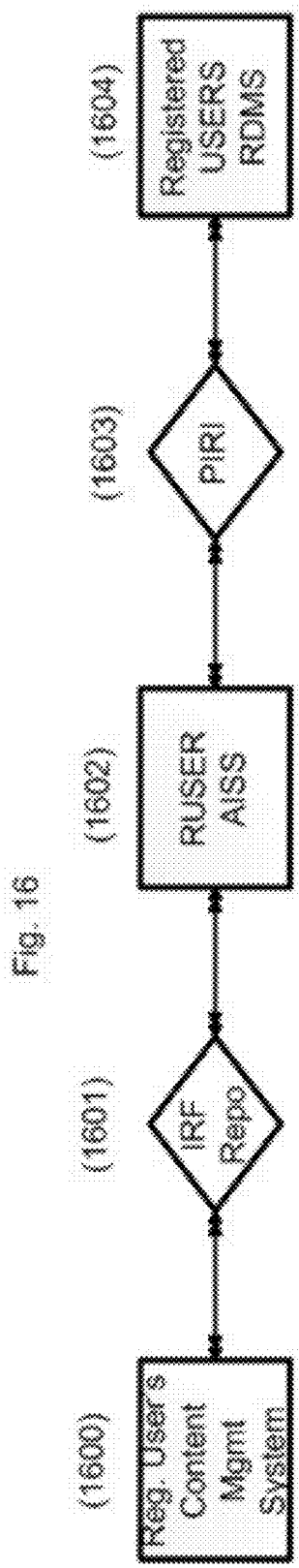
FIG. 16 presents key Registered User's Content Management process steps.

As FIG. 1 and FIG. 12 indicate, at the time of installation of the dynamic content distribution system on a computer device (100), during Registered User registration (101), the Registered User's are tasked to complete a series of Dynamic Surveys (102) and a Registered User Profile is created within the Registered User Database (103). The answers to the Dynamic Surveys (102) are used to create the Registered User's AIS Score (104) which indicates information about the Registered User's profile, including personality characterizing data. The Registered User Profile (103) and the Registered User's AIS Score (104) for each individual Registered User is then registered in the collective Registered USERS RDMS (105), which is a collection of different dynamic content distribution system Registered Users. Specifically, after the psychometric AIS Score (104) is formulated and given to the Registered User, the Registered User's registration information and psychometric AIS Score (104) is stored under the individual Registered User's account located in the Registered USERS Relational Database Management System (RDMS) (105), see FIG. 1. FIG. 16 presents an example of an Alpha-Numeric Identification Sequential Score (AIS Score).

Content Assigned MetaDerms (CAM)—Subscriber Assigned MetaDerms (SAM)

As previously explained, each Registered User's psychometric attributes are used to create an AIS Score and a PIRI INTELLIGENT API monitors the Registered User's survey responses (via storing the Registered User's current AIS Score) and continually monitors the Registered User's reactions to content that is suggested to the Registered User. The content suggested to the Registered User is identified by MetaData Elements called MetaDerm(s) which are comparable to some of the elements of the tables of data which comprise the Registered User's AIS Score. Further, throughout the present invention MetaData Elements are used consistent with the data fields of various databases. See FIG. 2 for exemplary database and table structures wherein the various MetaDerm data is comparable among the databases and tables of the present invention.

A MetaDerm is a specially derived identification code used, by the PIRI INTELLIGENT API to suggest content that is relevant to the end users Psychometric Attributes. The System uses two types of MetaDerms. Subscriber Assigned MetaDerms (SAM) which are dynamic with reciprocal features and Content Assigned MetaDerms (CAM) which are transient with compensating features.

Subscriber Assigned MetaDerms (SAM) Registration

Registration is required to become a Registered SAM Affiliate (109) (also referred to herein as a SAM User) and receive a SAM AIS Score (113) wherein SAM Affiliates (109) are required complete a registration process similar to the one the Registered User 100 completes during installation or registration of a new user.

As shown in FIG. 1 and FIG. 13, the SAM Affiliate (109) registration process includes completion of a SAM Registration questionnaire (110) and a Static Survey Series (111) (which differs from the Registered User Dynamic Survey Series (102)). The SAM Registration questionnaire (110) and the Static Survey Series (111) contain questions which compose the information that will be stored in a SAM RDMS (114) (also referred to herein as a SAM MetaData Registry) and exemplary information collected during SAM Registration process is as shown in the data tables of FIG. 5.

After the SAM Affiliate (109) completes the SAM Registration questionnaire (110) aznd the Static Survey (111) and supplies the required information, it is stored as Registered SAM Affiliate information in the Registered SAM Database (112), a unique account is created for the SAM Affiliate (109) and a SAM AIS Score (113) is assigned to the SAM Affiliate (109).

Once the SAM AIS Score (113) is assigned, the Registered SAM User information is stored by the Registered SAM RDMS (114) (which maintains a database collection of Registered SAM Affiliates) and the PIRI Intelligent API is programmed to process the SAM AIS Score (113). Programming of the PIRI Intelligent API to process the SAM AIS Score (113) includes known methods of creating scripts, queries, and executable code to perform operations using the data and date fields provided by the SAM AIS Score (113).

As further shown in FIG. 1, after registration of an individual User with the Registered USERS RDMS (105) is complete, the PIRI INTELLIGENT API (108) processes the USERS RDMS Registration (105) information and sends the collective data to the Registered SAM RDMS (114). The PIRI INTELLIGENT API (115) is used to associate the USERS RDMS Registration (105) to a Registered SAM Affiliate (109). More particularly, the PIRI INTELLIGENT API (115) associates each individual Registered User's AIS score (104) with a SAM AIS score (113).

After the Registered User's AIS Score (104) is associated with the Affiliate SAM AIS Score (113), the PIRI INTELLIGENT API (115) registers the Registered User's AIS Score (104) in the Registered SAM Affiliate Profile (112) and in turn Registers the SAM AIS Score (113) in the Register User's Profile (103) creating an Affiliate Association.

Content Assigned MetaDerms (CAM) Registration

In order to receive a CAM number, Content Providers (content includes video, audio, graphical, textual, and other multimedia or computer related data) are required complete a registration process similar to the one the registered user complete during installation or registration of a new user. The CAM Content Provider (116) is required to complete a CAM Registration questionnaire (117), and the Content Provider is further required to complete a Static Survey Series (118) which differs from the Registered User Dynamic Survey Series(102).

Figure 6:
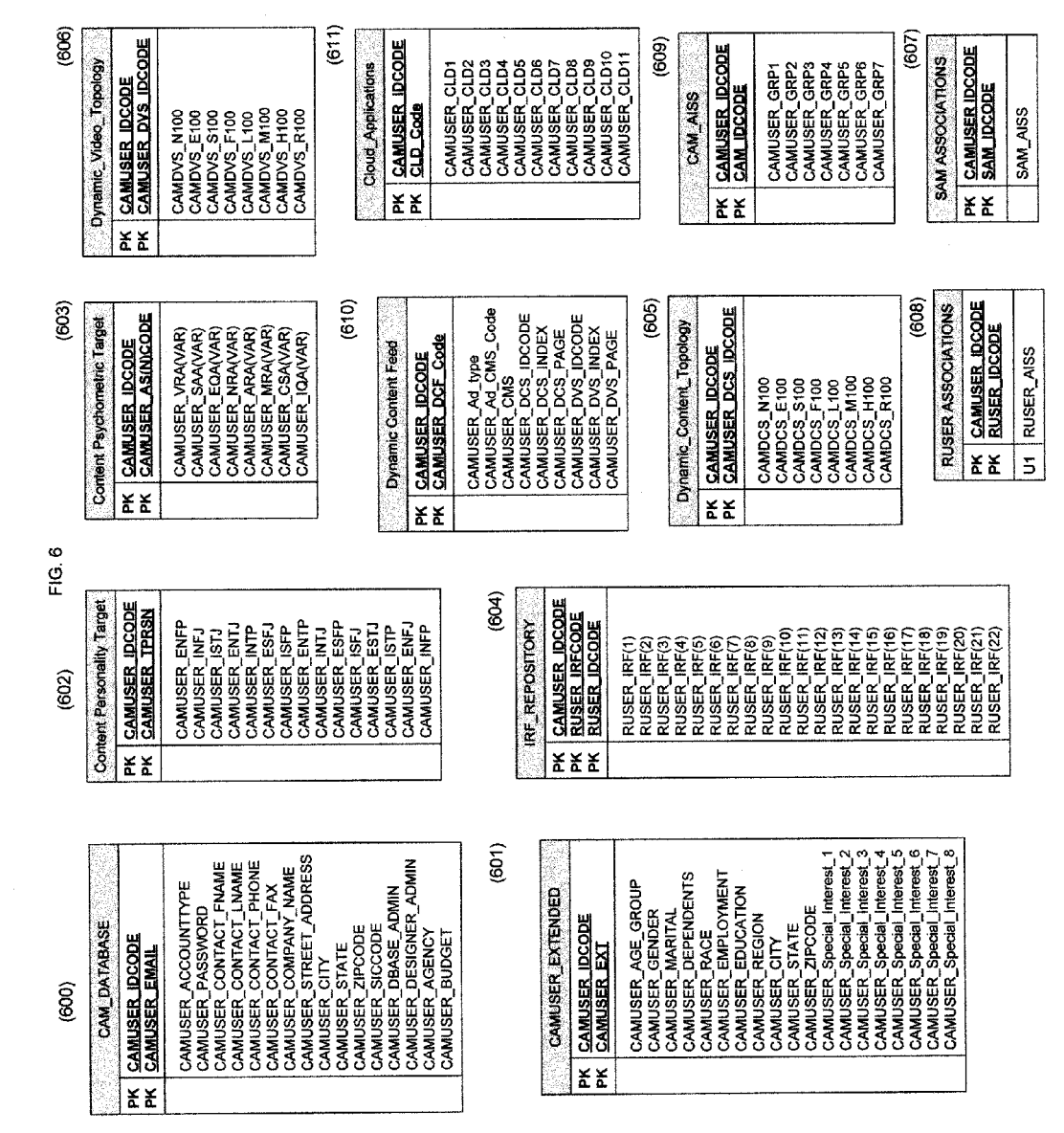

The Static Survey Series (118) contains questions which compose the information that will be stored in a CAM RDMS (121) (also referred to herein as a CAM MetaData Registry) and exemplary information collected during the overall CAM Registration process is shown in the data tables on FIG. 6.

As shown in FIG. 1 and FIG. 14, after the CAM Content Provider (116) completes the CAM Registration questionnaire (117) and the Static Survey (118) and supplies the required information, it is stored Registered CAM Provider information in the Registered CAM Database (119) and a unique account is created for the CAM Content Provider (116) and a CAM AIS Score (120) is assigned to the CAM Content Provider (116).

Once the CAM AIS Score (120) is assigned, the Registered CAM Provider information is stored by the Registered CAM RDMS (121) (which maintains a database collection of Registered CAM Providers) and the PIRI Intelligent API is programmed to process the CAM AIS Score (120). Programming of the PIRI Intelligent API to process the CAM AIS Score (120) includes known methods of creating scripts, queries, and executable code to perform operations using the data and date fields provided by the CAM AIS Score (120).

As explained above the present invention uses at least one or more and preferably four Relational Database Management Systems (RDMS) (i.e., the Registered CAM RDMS 121, the Registered User RDMS 105, Registered SAM RDMS 114, the Content/Video Management RDMS 1000/1004). Further, the present invention uses at least one or more and preferable three application surveys. In no particular order of important the RDMS are the Registered User RDMS (105), the Registered SAM RDMS (114) the Registered CAM RDMS (121) and the Dynamic Survey Database which is used by (102). The Application servers consist of the Dynamic Video Server (not shown) which functions similar to how the Dynamic Content Server (122) operates and the PIRI Application Server (126) which employs the PIRI Intelligent API to process how information is exchange between the various Relational Database Management Systems and the Application Servers.

The PIRI INTELLIGENT API processes the Registered User AIS Score (104), the SAM AIS Score (113) and CAM AIS Score (120) and uses the data from of the respective MetaData Registries to determine how content is displayed; to whom the content is displayed; what type of content that is displayed; when and why particular content is displayed.

After the Affiliate Association is stored in the Registered User's RDMS (105) under the user's Registered User's Profile (103) and subsequently stored in the Registered SAM RDMS (114) under the Affiliate's Registered SAM Profile (112), the PIRI INTELLIGENT API (115) processes the collective data and Affiliate Associations and scans the Registered CAM RDMS (121) for CAM AIS Scores (120) that matches the user's Registered User's AIS Score (104).

When matches are found, The PIRI INTELLIGENT API (125) retrieves the matching content from a Dynamic Content Server (122) and sends the content to a Content Management System (107) as suggestion based on the Dynamic Survey (102) results. The Content Management System (107) categorizes the content and, if required, the User is prompted to customize the Content display. After the User selects the content, if required, Web Browser Plug-In components are installed. Next the PIRI INTELLIGENT API (108) processes the content selections and a link to the Dynamic Content Server (122) is made, and at this point the installation is complete.

Dynamic Content Server

FIG. 15. generally depicts the process the Dynamic Content Server (122) uses to distribute content to the Registered User's Content Management System (107). The Dynamic Content Server (122) sends and receives information from the PIRI Application Server (126). The PIRI Application Server (126) uses the PIRI Intelligent API program (125) to process data from each of the four Relational Database Management Systems (i.e., the Registered CAM RDMS 121, the Registered User RDMS 105, Registered SAM RDMS 114, the Content/Video Management RDMS 1000/1004).

The PIRI Suggestive Operator (125) processes and exchanges data to and from the Registered CAM RDMS (121). The PIRI Suggestive Operator (115) processes and exchange data to and from the Registered SAM RDMS (114). The PIRI Suggestive Operator (108-A) processes and exchanges data to and from the Registered Users RDMS (105). The PIRI Suggestive Operator (108-A) process and exchange data to and from the Web Browser Plugin (106). The PIRI Suggestive Operator (108-B) process and exchange data to and from the Registered User's Content Management System (107).

The Content/Video Management RDMS 1000/1004. as shown in FIG. 10 includes Uniform Markup Language entities (1001, 1002, 1003, 1005, 1006, and 1007 which are referred to herein as UML Entities) which send data to the PIRI INTELLIGENT OPERATOR to determine how the content is distributed to Register's Users.

Item Response Function

Additionally, the User's Content Management System (107) uses the Item Response Functions (908-913, also referred to herein as the IRF) as shown in FIG. 9 and FIG. 16, to process scripts and instructions used track how the user responds to suggested content. The IRF processing script uses an IRF Repository (908) track how the user responds to content that is sent to the Registered User's Contentment Management System (901). Based on the user's response the IRF data is processed by the PIRI Suggestive Operator (920) and the IRF data is to sent to the user's Registered User's RDMS (105 or 926). Note—the Registered User's RDMS (105) is the same component as the Registered User's RDMS (926).

User Surveys

During installation, the initial survey that the User completes is a specialized personality test (also referred to herein as a survey). It is important to point out that the Registered User's AIS Score (104) stores the Registered User's primary and secondary personality traits. During normal operation, the user may take 8 or more additional Psychometric Tests that are used in addition to the User's quantified personality attributes (from personality testing) to suggest content and solutions to the User.

During normal operations, how the user interacts with content, websites, applications, widgets, advertisements, modules and other aspects of the program is monitored by the Item Response Function (IRF) using processing scripts to collect and transfer data and this information is used to improve the user's computing experience.

Figure 17:
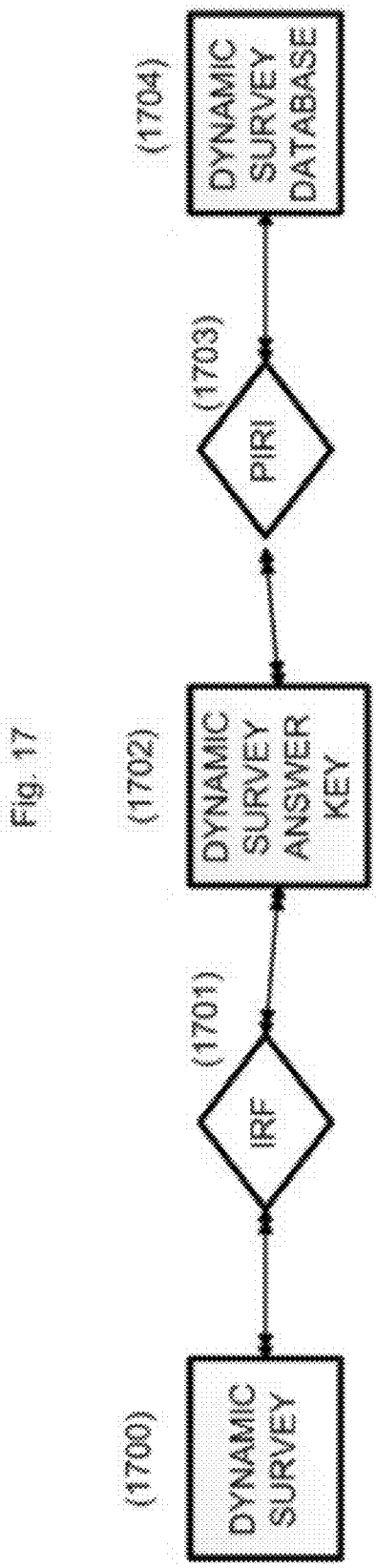
FIG. 17 presents key Dynamic Survey process steps.

During normal use, the User will be prompted to complete additional Psychometric Surveys. As shown in FIG. 17, depending on what type of Dynamic Survey (102 or 902) that user completes, dictates the type of information that is collected, processed and stored by the IRF Repository (909). The User's answers to the psychometric survey is compared to a Dynamic Survey Answer Key (915) and the PIRI Suggestive Operator (921) processes the data and send the data to the Dynamic Survey Database (927).

During installation, the IRF uses processing scripts (909) and creates a link between each database to chart the user's interactions with application. More information about IRF process is provided in the database descriptions that follow.

Figure 18:
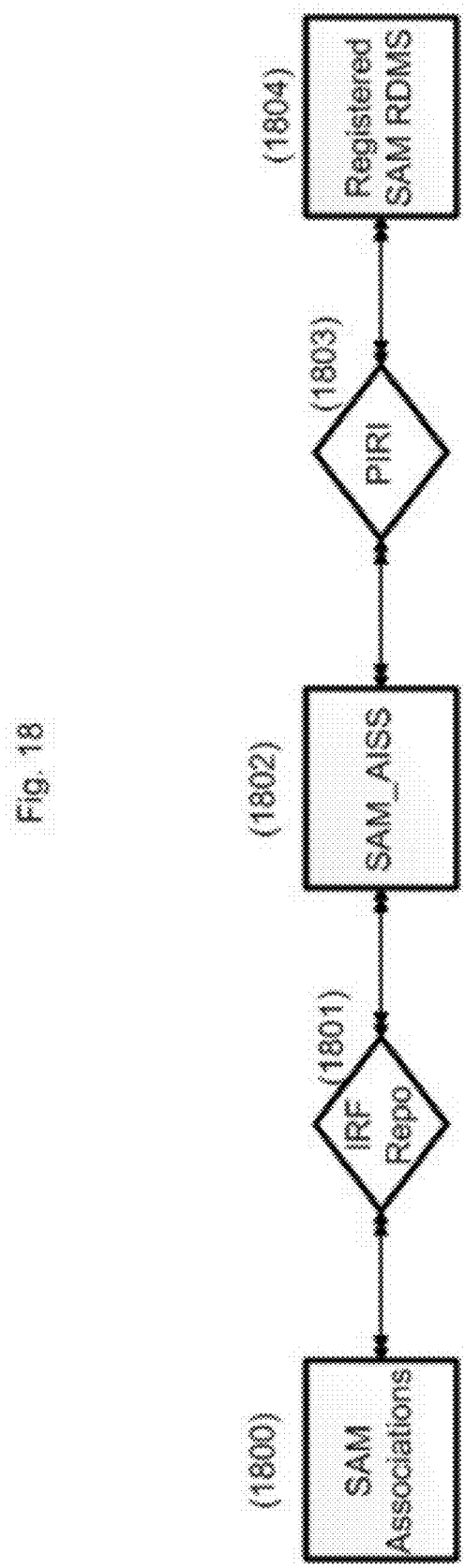
FIG. 18 presents key SAM Association process steps.

During normal use, the IRF uses processing scripts (910) to track the Registered User (100) responses and send the information to the IRF repository (909) to create a SAM Association, as shown in FIG. 18. Specifically, the SAM_AIS Score associates the IRF processing data to SAM Affiliates creating a SAM Association (903) with the IRF data and then the PIRI Suggestive Operator (922) processes the data and stores the results in the Registered SAM RDMS (928).

Figure 19:
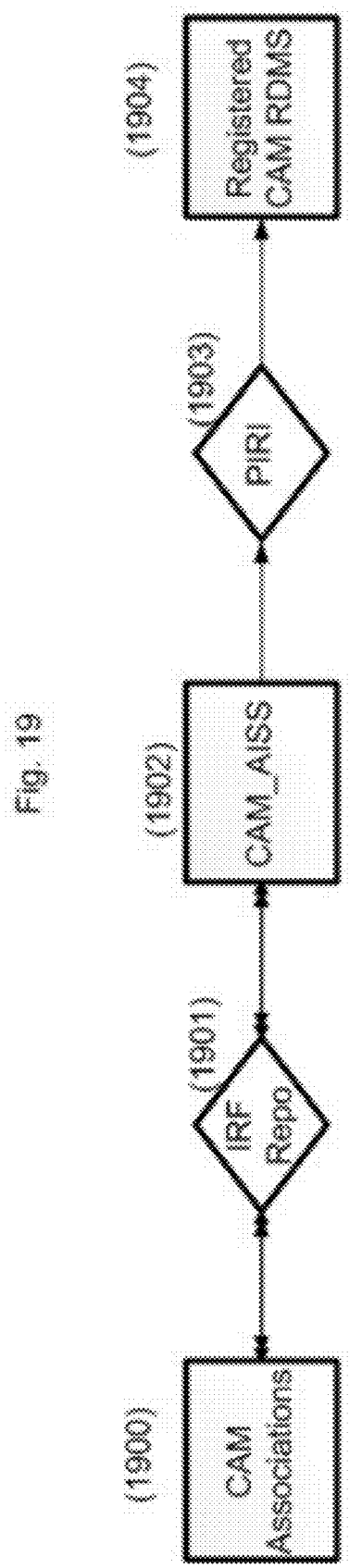
FIG. 19 presents key CAM Association process steps.

During normal use the IRF uses processing scripts (911) to track the Registered User (100) responses and send the information to the IRF repository (911), create a CAM Association, as shown in FIG. 19. Specifically, the CAM_AIS Score associates the IRF processing data to CAM Affiliates creating a CAM Association (904) with the IRF data and then the PIRI Suggestive Operator (923) processes the data and stores the results in the Registered CAM RDMS (929).

As shown in FIG. 20, during normal use the IRF uses processing scripts (912) to send the Registered User IRF response data to the Dynamic Content Server (930) by using Dynamic Content Associations (905). The Dynamic Content Associations (905) exchange data with the Registered CAM RDMS (121/929), Registered SAM RDMS (114/928), and the Registered User's RDMS (105/926) using the PIRI Suggestive Operator(s) (925), (924), (923), (922), (921), and (920). The various previously mentioned associations and the users responses determines the specific content sent to the Registered User.

During normal use, as shown in FIG. 21, the IRF processing scripts (913) sends the Registered User IRF response data to the Dynamic Content Video Server (931) using Dynamic Video Associations (906). The Dynamic Video Associations (906) exchanges data with the Registered CAM RDMS (929), Registered SAM RDMS (928), and the Registered User's RDMS (926) using the PIRI Suggestive Operator(s) (925), (924), (923), (922), (921), and (920). The various previously mentioned associations and the users responses determines the specific content sent to the Registered User.

In summary, FIG. 16 depicts wherein the Registered User's Content Management System (901) is encoded with IRF information and as the User uses the application, the IRF Repository collects the data associated the responses with the Registered User's AIS Score (914) and the PIRI Suggestive operator sends the data to the Registered USERS RDMS (926).

In summary, FIG. 17 depicts the Dynamic Survey operation. The IRF Repository sends data to the Dynamic Survey Answer Key (915) and the applicable psychometric attributes are identified and updated and then the PIRI Suggestive Operator (921) collects the data and stores the information in the Dynamic Survey Database (927).

In summary, FIG. 18 presents wherein the IRF processing scripts track how the user interacts with information and content that is endorsed by the SAM Affiliate. The SAM Associations (903) sends and receive data to the IRF Repository (910) and the SAM AIS Score (916) is used to identify the SAM Affiliate and is also used by the PIRI Suggestive Operator (922) to associate the IRF responses with the SAM Affiliates Registered SAM RDMS (928).

In summary, FIG. 19 presents wherein the IRF processing scripts track how the user interacts with information and content that is provided by the CAM Content Provider. The CAM Associations (904) sends and receive data to the IRF Repository (911) and the CAM AIS Score (917) is used to identify the CAM Content Provider and is used by the PIRI Suggestive Operator (923) to associate IRF responses with CAM Content Provider's Registered CAM RDMS (929).

In summary, FIG. 20 presents wherein the IRF processing scripts track how the user interacts with the content that is disseminated to the User. In this case the Dynamic Content Associations (905) are encoded into the user's Content Management System and every time the user reacts to content, the IRF processing scripts collect the data and sends the data to the IRF Repository (912) using, for example, a DCS Identification Code (918), and the PIRI Suggestive Operator (924) sends this data to the Dynamic Content Server (930).

In summary, FIG. 21 presents wherein the IRF processing scripts track how the user interacts with the content that is disseminated to the User. In this case the Dynamic Video Associations (906) are encoded into the user's Content Management System and when the user reacts to the video content, the IRF Processing Scripts collects the data and sends the data to the IRF Repository (913) using, for example, a DVS Identification Code (919), and the PIRI Suggestive Operator (925) sends this data to the Dynamic Video Content Server (931).

Dynamic Psychometric Survey and Dynamic Survey Answer Key

To complete registration users are required to complete a Personality Survey. In a preferred embodiment of the present invention, each survey has 8 sections and the User is asked 4 questions for each section. The answers from the Personality Survey are scored and used as components of the Registered User's AIS Score.

Figure 3:
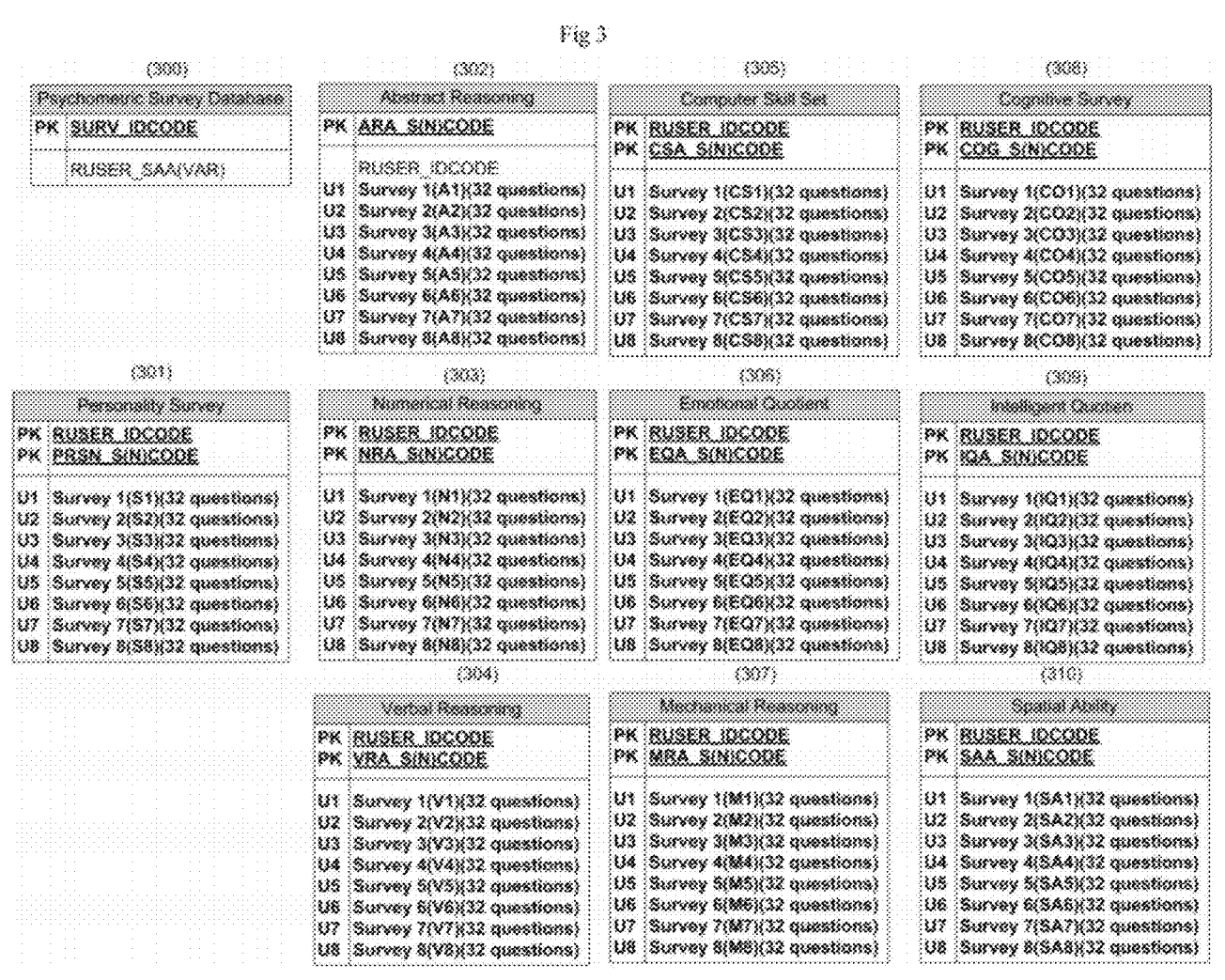

The Dynamic Survey Database as shown in FIG. 3, consists of 10 survey categories that contains 8 surveys per category for a total of 80 surveys. The first survey that is completed when the user installs the application is the Personality Survey (301). Like the other categories, the Personality Survey has 8 surveys stored in the Database. Surveys are chosen based on the user's age and sex.

As shown in (301) each survey has 32 questions. Each survey is broken into 8 sections and the user is asked 4 questions per section. The answers to the survey are stored in FIG. 4 Dynamic Survey Answer Database. For instance the Personality Survey Entity (301) has a corresponding Personality Answer Key Entity (401).

The Additional Dynamic Survey Entities such as Abstract Reasoning (302), Numerical Reasoning (303), Verbal Reasoning (304), Computer Skill Set (305), Emotional Quotient (306), Mechanical Reasoning (307), Cognitive Survey (308), Intelligent Quotient (309) and Spatial Ability (310) are presented as additional surveys that Registered Users may complete during the normal course of operating the application. Like the Personality Survey Entity (301) each additional Survey Entity has a corresponding Answer Key Entity as shown in FIG. 4.

An example of a Register Users (Personality AIS Score) is shown in FIG. 22.

FIG. 2 depicts the Register User's Database. (201) the RUSER_DATABASE Entity collects and stores the User's basic account information. (202) RUSER_EXTENDED Entity collects and stores the User's extended account information and the ASURV_RESULTS Entity (203) collects and stores the user's Psychometric scores derived from the Additional Dynamic Surveys as [0048] explains.

The Register User's Database also contains (204) SURV_RESULTS Entity which collects and scores the answers to the Dynamic Surveys that the user completes. (207) DYNAMIC_Mood(VAR)1 Entity is used by Third Party Applications FIG. 11 to indicate, collect and store the user's mood. An example of a Mood that user may select to indicate how they are feeling is —Happy—, —Excited—, —Sad—, —Depressed— and others. The DYNAMIC_Mood(VAR)1 Entity stores over 150 moods that the user may select from.

The IRF_Repository Entity (208) collects and stores codes that are used to identify how the user interacts with the applications. (208) Entity also is used by the Item Response Function—IRF—Process to collect, store and process how the user responds to content during normal operations.

The Dynamic_Content_Topology Entity (205) and the Dynamic_Video_Topology Entity (206) is used collect and store information regarding the Dynamic Content and Dynamic Video topologies that Application uses during normal operations.

The RUSER_PA(VAR) Entities (212)-(219) collects and stores the Dynamic Survey Scores. There are a total of 8 RUSER_RA(VAR) entities and each entity corresponds to each of the 8 sections that are in the Dynamic Surveys.

The RUSER_AISS (211) collects and stores the User's AIS Score that is used by the PIRI INTELLIGENT API to identify the user, to track the user's primary and secondary personality traits as well as additional information that is stored in each group. RUSER_GRP1 stores a code that identifies the users sex and age, RUSER_GRP2 stores a code that identifies the User's Database Repository, RUSER_GRP3 stores a code that identifies the User's Social Demographic Code, RUSER_GRP4 stores the User's Primary Personality Trait-1, RUSER_GRP5 stores the user's Secondary Personality Trait-2, RUSER_GRP6 stores a code that identify the User's Item Response Identification Code and RUSER_GRP7 stores a unique code that identify the User's Registration Code. The combined table is used to derive the User's Registration AIS Score.

Figure 24:
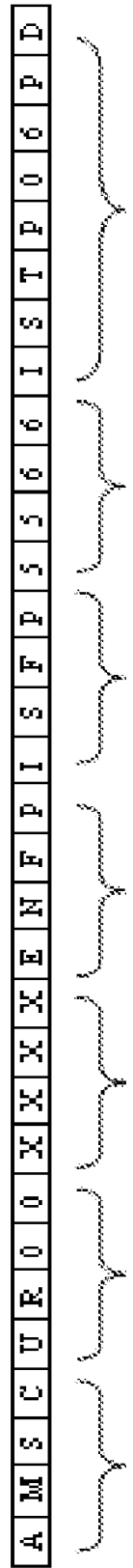
FIG. 24 presents an exemplary Subscriber Assigned Metaderm Alpha-Numerical Identification Sequential Score scheme (SAM AIS Score or SAM AISS).

FIG. 24 presents an exemplary Subscriber Assigned Metaderm Alpha-Numeric Identification Sequential Score scheme (SAM AIS Score or SAM AISS).

The SAM_Association entity (209) stores the SAM AIS Score associated with the registered user's account, and the CAM_Association entity (210) stores the CAM AIS Score associated with the registered user's account.

FIG. 5 depicts the Subscriber Assigned Metaderm Database. (500) the SAMUSER_DATABASE Entity collects and stores the Subscriber's basic account information. SAMUSER_EXTENDED Entity (501) collects and stores the Subscriber's intended target user's attributes. The SAMUSER_Personality Target Entity (502) collects and stores the target personality traits that the subscriber SAM_AISS Entity (509) will be associated with.

The SAMUSER_Psychometric Target Entity (503) collects and stores the target psychometric profiles that the subscriber SAM_AISS Entity (509) will be associated with. IRF_Respository Entity (504) tracks, stores and collects the User's responses to content, and credits the SAM Affiliate as the affiliate when necessary.

The Dynamic_Content_Topology Entity (505) collects and stores what type of content that is associated with the SAM Affiliate and indicates which Dynamic Content Server Database (FIG. 7.) is responsible for the dynamic distribution of the content that is associated with the SAM_AISS Entity (509).

The Dynamic_Video_Topology Entity (506) collects and stores what type of content that is associated with the SAM Affiliate and indicates which Dynamic Video Server Database (FIG. 8) is responsible for the dynamic distribution of the video content that is associated with the SAM_AISS Entity (509).

The SAM_AISS Entity (509) collects and stores the Subscriber's AIS Score that is used by the PIRI INTELLIGENT API to identify the Subscriber, to track the subscriber affiliations as well as additional information that is stored in each group. SAMUSER_GRP1 stores a code that identifies the Subscriber's category, SAMUSER_GRP2 stores a code that identify the Subscriber's Database Repository, SAMUSER_GRP3 stores a code that identifies the Subscribers Company Code, SAMUSER_GRP4 stores the target Personality Trait-1, SAMUSER_GRP5 stores the target Personality Trait-2, SAMUSER_GRP6 stores the target Personality Trait-3, RUSER_GRP7 stores the target Personality Trait-4. The combined table is used to derived the Subscriber's AIS Score.

Figure 23:
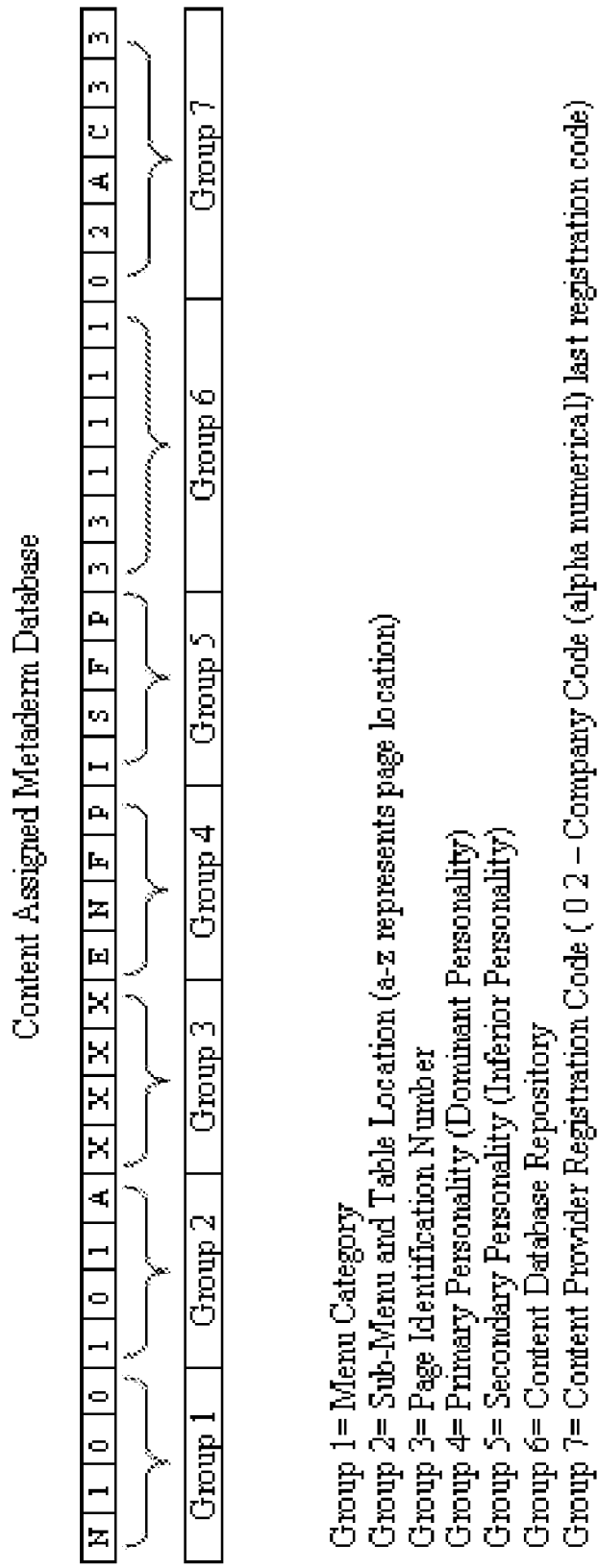
FIG. 23 presents an exemplary Content Assigned Metaderm Alpha-Numeric Identification Sequential Score scheme (CAM AIS Score or CAM AISS).

FIG. 23 presents an exemplary Content Assigned Metaderm Alpha-Numeric Identification Sequential Score scheme (CAM AIS Score or CAM AISS).

The CAM_Association entity (507) stores the CAM AIS Score numbers that are associated with the Subscriber's Account, and the RUSER_Association entity (508) stores the RUSER AIS Score numbers that are associated with the Subscriber's Affiliate account.

FIG. 6 depicts the Content Assigned Metaderm Database. (600) the CAMUSER_DATABASE Entity collects and stores the Content Provider's basic account information. CAMUSER_EXTENDED Entity (601) collects and stores the Content Provider's intended target user's attributes. The CAMUSER_Personality Target (602) collects and stores the target personality traits that the Content Provider's CAM_AISS (609) will be associated with.

The CAMUSER_Psychometric Target Entity (603) collects and stores the target psychometric profiles that the Content Provider's CAM_AISS Entity (609) will be associated with. IRF_Respository Entity (604) tracks, stores and collects the User's responses to content, and uses this information to suggest additional content.

The Dynamic_Content_Topology Entity (605) collects and stores where the content located within the User's Content Management System and indicates which Dynamic Content Server Database (FIG. 7.) is responsible for the dynamic distribution of the content that is associated with the CAM_AISS (609) Entity.

The Dynamic_Video_Topology Entity (606) collects and stores where the video content is located within the User's Content Management System and indicates which Dynamic Video Server Database (FIG. 8) is responsible for the dynamic distribution of the video content that is associated with the CAM_AISS (609) Entity.

The Dynamic Content Feed Entity (610) stores identification codes which indicate the content type, the Content Management System where the content is located, the Content's identification code, the Content Index and Page, as well as the Video Content Index and Page. These codes are use by the Dynamic Content Servers to send Dynamic Content Feeds to the User's Content Management System.

The Cloud Application Entity (611) stores identification codes which indicate the Cloud Application type, and the Cloud Server where the application is located.

The SAM_Association entity (607) stores the SAM AIS Score numbers that are associated with the Content Provider's Account, and the RUSER_Association entity (508) stores the RUSER AIS Score numbers that are associated with the Content Provider's account.

(607) CAMUSER_GRP1 stores a code that identifies the —Menu— category where the content is located, CAMUSER_GRP2 stores a code that identify the —Submenu— category where the content is located, CAMUSER_GRP3 stores a code that identify the —Page Identification Number— where the content is located, CAMUSER_GRP4 stores the target Personality Trait-1, CAMUSER_GRP5 stores the target Personality Trait-2, SAMUSER_GRP6 stores a code that identify the Content's Database Repository, RUSER_GRP7 stores a code that identify the Content Provider's Identification Code. The combined tables are used to derived the Subscriber's AIS Score.

Dynamic Content Server Database

Figure 7:
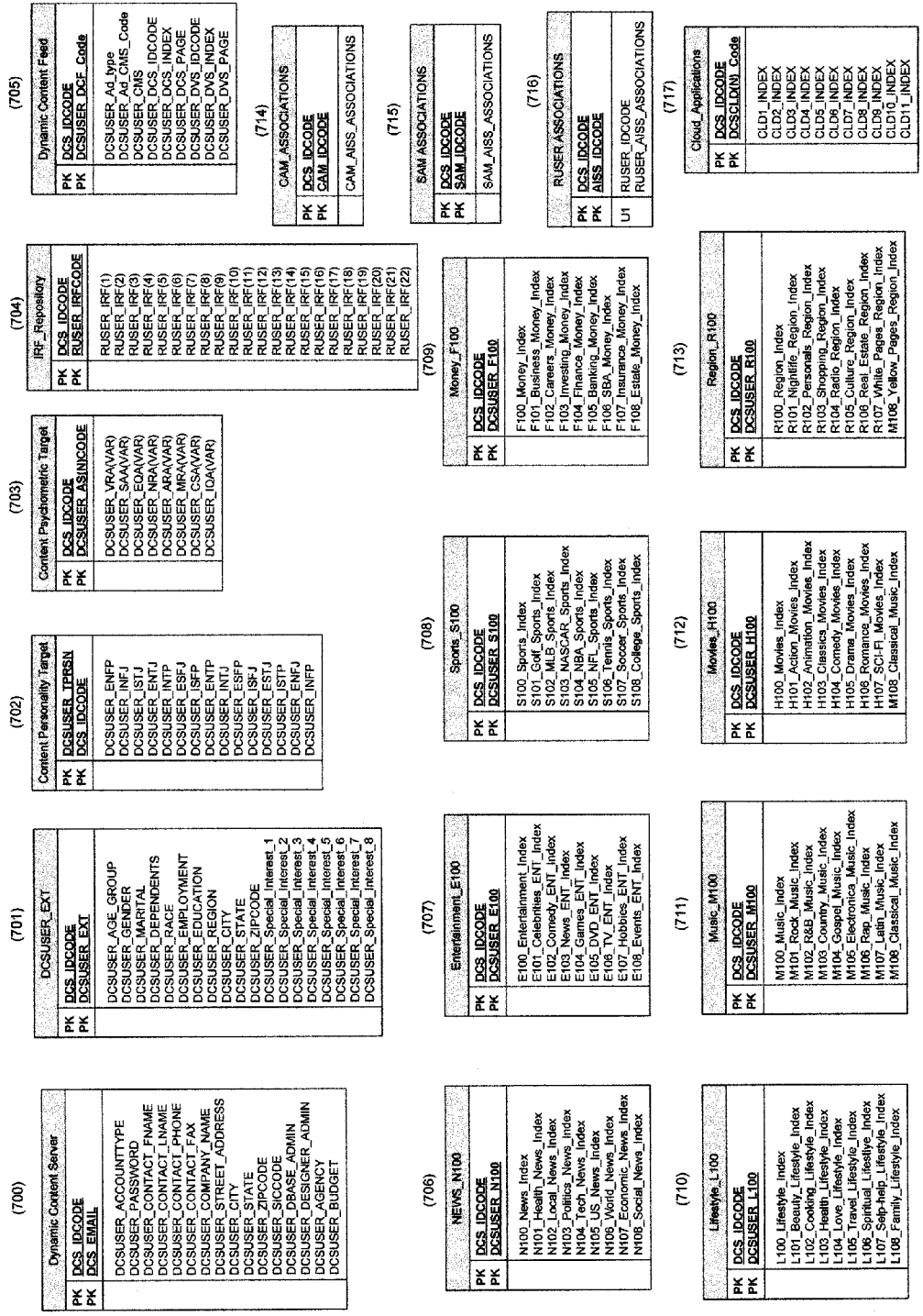
FIG. 7 presents exemplary tables of the Dynamic Content Server relational database.

FIG. 7 depicts the Dynamic Content Server Database. (700) the DCSSERVER_DATABASE Entity collects and stores the Content Administrator account information. DCSSERVER_EXTENDED Entity (701) collects and stores the Content Administrator intended target user's attributes. The DCSSERVER_EXTENDED Target (702) collects and stores the target personality traits that the Content will be distributed to.

The Content Psychometric Target Entity (703) collects and stores Psychometric data that to which the Dynamic Content will be associated. IRF_Repository Entity (704) tracks, stores and collects the User's responses to content and the user interaction with the application, the IRF_Repository Entity (704) uses this information to suggest additional content.

The Dynamic Content Feed Entity (705) stores identification codes which indicate the content type, the Content Management System where the content is located, the Content's identification code, the Content Index and Page, as well as the Video Content Index and Page. These codes are use by the Dynamic Content Servers to send Dynamic Content Feeds to the User's Content Management System.

Entities (706), (707), (708), (709), (710), (711), (712), and (713) indicates the type of Dynamic Content that is stored and Menu, and Submenu, and Page where the content will be distributed to. The Cloud_Applications Entity (717) stores identification codes which indicate the Cloud Application type, and the Cloud Server where the application is located.

The CAM_Association entity (714) stores the CAM AIS Score numbers that are associated with the Content. The SAM_Association entity (715) stores the SAM AIS Score numbers that are associated with the Content and the RUSER_Association entity (716) stores the RUSER AIS Score numbers that are Dynamic Content will be distributed.

Figure 8:
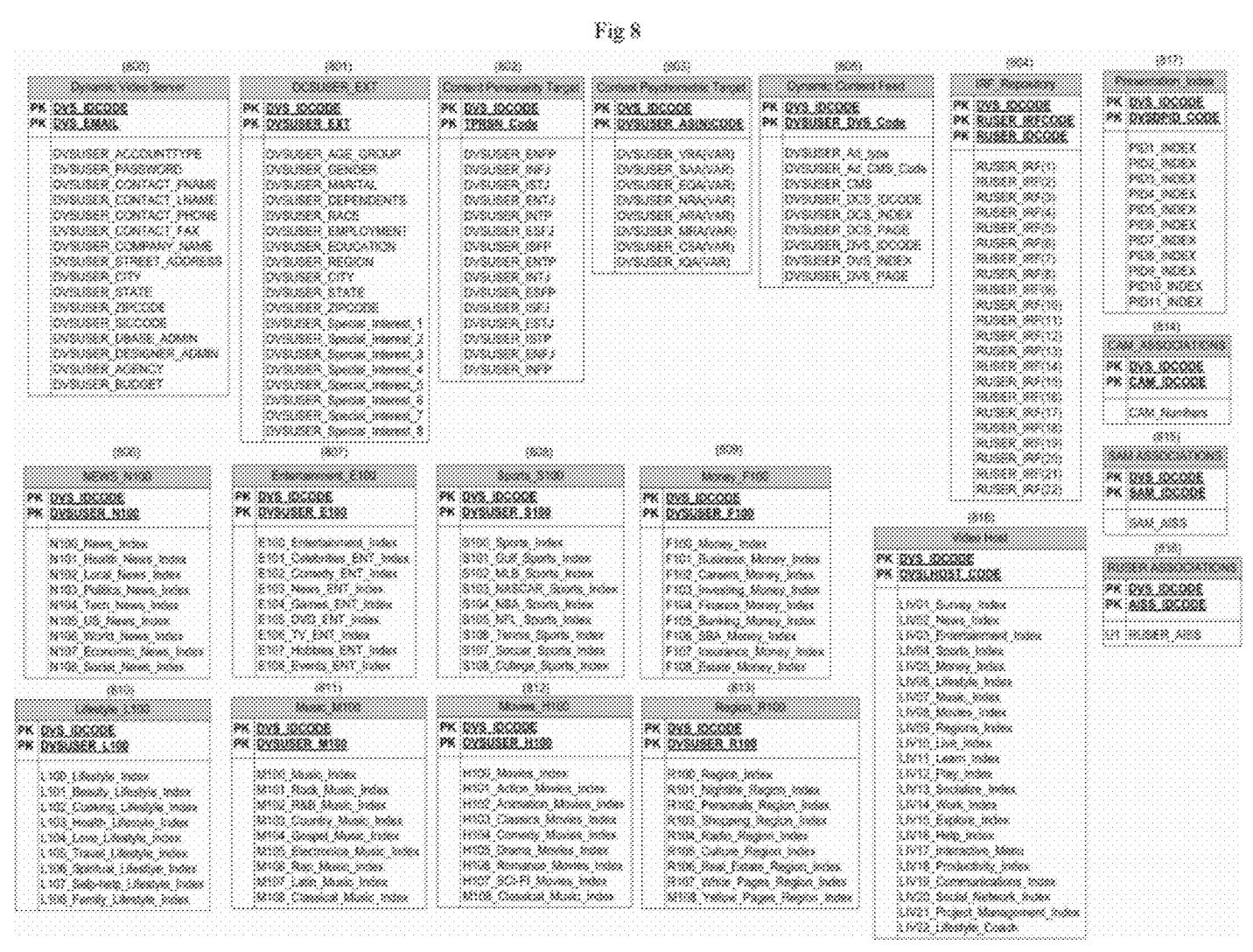

FIG. 8 depicts the Dynamic Video Server Database (800) the DVSSERVER_DATABASE Entity collects and stores the Video Content Administrator account information. DVSSERVER_EXTENDED Entity (801) collects and stores the Video Content Administrator's intended target user's attributes. The DVSSERVER_EXTENDED Target (802) collects and stores the target personality traits that the Video Content will be distributed to.

The Content Psychometric Target Entity (803) collects and stores Psychometric data that the Dynamic Video Content will be associated with. IRF_Respository Entity (804) tracks, stores and collects the User's responses to video content and the user interaction with the application, the IRF_Respository Entity (804) uses this information to suggest additional video content.

The Dynamic Content Feed Entity (805) stores identification codes which indicate the video content type, the Content Management System where the content is located, the Video Content's identification code, the Video Content Index and Page, as well as the Dynamic Content Index and Page. These codes are use by the Dynamic Video Content Servers to send Dynamic Video Content Feeds to the User's Content Management System.

Entities (806), (807), (808), (809), (810), (811), (812), and (813) indicates the type of Dynamic Video Content that is stored, the Menu, and Submenu, and Page where the video content will be distributed to. The Video Host Entity (717) stores Live Video Host Segments, and identifies where the Live Video Host are located in the application. The Presentation_Index (818) stores information that about dynamic video presentations.

The CAM_Association entity (814) stores the CAM AIS Score numbers that are associated with the Video Content. The SAM_Association entity (815) stores the SAM AIS Score numbers that are associated with the Video Content and the RUSER_Association entity (816) stores the RUSER AIS Score numbers that are Dynamic Video Content will be distributed.

Item Response Function (IRF)

Exemplary Item Response Function (processing script)

$$p_i(\theta) = c_i + \frac{1 - c_i}{1 + e^{-a_i(\theta - b_i)}}$$

The Dynamic Content Distribution System uses the Item Response Function (IRF) equation as an algorithm to suggest digital content to end-users based on psychometric reasoning. The PIRI INTELLIGENT API uses the above Item Response Functions (IRF) equation as an algorithm to process the following entities featured in FIG. 10. These entities are (1000), (1001), (1002), (1003), (1004), (1004), (1005), (1006), and (1007).

The Tabular Data used in FIG. 10 UML Entity (1000) is encoded into the Content Management System and is used by the PIRI INTELLIGENT API to track, monitor and store how the user responds to content.

The Tabular Data used in FIG. 10 UML Entity (1001) is encoded into the Registered SAM RDMS and is used by the PIRI INTELLIGENT API to track, monitor and store how the user responds to content.

The Tabular Data used in FIG. 10 UML Entity (1002) is encoded into the Registered CAM RDMS and is used by the PIRI INTELLIGENT API to track, monitor and store how the user responds to content.

The Tabular Data used in FIG. 10 UML Entity (1003) is encoded into the Dynamic Content Server and is used by the PIRI INTELLIGENT API to track monitor and store how the user responds to content.

The Tabular Data used in FIG. 10 UML Entity (1004) is encoded into the Video Management System and is used by the PIRI INTELLIGENT API to track monitor and store how the user responds to video content.

The Tabular Data used in FIG. 10 UML Entity (1005) is encoded into the Registered SAM RDMS and is used by the PIRI INTELLIGENT API to track monitor and store how the user responds to video content.

The Tabular Data used in FIG. 10. UML Entity (1006) is encoded into the Registered CAM RDMS and is used by the PIRI INTELLIGENT API to track monitor and store how the user responds to video content.

The Tabular Data used in FIG. 10 UML Entity (1007) is encoded into the Dynamic Video Server and is used by the PIRI INTELLIGENT API to track monitor and store how users responds to video content.

All the UML Entities ranging from (1000) to (1007) sends data to the PIRI INTELLIGENT OPERATOR to determine how the Content is distributed to Register's Users.

In Table 1, Packages 1-8 contain Tabular Data that the PIRI Intelligent API uses in association with the relational database management system.

Package 1 is used to exchange data from the Registered User's RMDS.

Package 2 is used to exchange data that relates to the Registered User's extended demographics.

Package 3 is used to exchange data that relates to the Registered User's psychometric profile.

Package 4 is used to exchange data that relates to the Registered User's personality attributes.

Package 5 is used to exchange the dynamic content data with the relational databases contained in the Dynamic Content Distribution system.

Package 6 is used to exchange the dynamic video data with the relational databases contained in the Dynamic Content Distribution system.

Package 7 is used to exchange IRF data with relational databases contained in the Dynamic Content Distribution System.

Package 8 is used to exchange the Alphanumerical Identification Sequential Scores with each of the appropriate relational databases and servers.

TABLE 1

| Package 1 | |
|---|---|
| RUSER_IDCODE | Register user's Identification with databases entities and tables |
| SURV_IDCODE | Register user's Survey Identification with databases entities and tables |
| ANSW_IDCODE | Register user's Survey Answers Identification with databases entities and tables |
| SAMUSER_IDCODE | Registers SAM User's Identification with databases entities and tables |
| CAMUSER_IDCODE | Registers CAM User's Identification with databases entities and tables |
| DCS_IDCODE | Register Dynamic Content System Identification with database entities and tables |
| DVS_IDCODE | Register Dynamic Video System Identification with database entities and tables |
| Package 2 | |
| RUSER_EXT | Registers user's extended demographics inform with User Database |
| SAMUSER_EXT | Registers user's extended demographics inform with SAM Database |
| CAMUSER_EXT | Registers user's extended demographics inform with CAM Database |
| DCSUSER_EXT | Registers user's extended demographics inform with Dynamic Content Server Database |
| DVSUSER_EXT | Registers user's extended demographics inform with Dynamic Video Server Database |
| Package 3 | |
| RUSER_AS(N)CODE | Register's Alternative Survey Database with Corresponding Databases |
| ARA_S(N)CODE | Registers Abstract Reasoning Scores with Corresponding Databases |
| NRA_S(N)CODE | Registers Numerical Reasoning Scores with Corresponding Databases |
| VRA_S(N)CODE | Registers Verbal Reasoning Scores with Corresponding Databases |
| CSA_S(N)CODE | Registers Computer Skill Sets with Corresponding Databases |
| EQA_S(N)CODE | Registers Emotional Quotient Scores with Corresponding Databases |
| MRA_S(N)CODE | Registers Mechanical Reasoning Scores with Corresponding Databases |
| COG_S(N)CODE | Registers Cognitive Reasoning with Corresponding Databases |
| IQA_S(N)CODE | Registers IQ Reasoning Scores with Corresponding Databases |
| SAA_S(N)CODE | Registers Spatial Ability Reasoning Scores with Corresponding Databases |
| SAMUSER_AS(N)CODE | Registers Users Alternative Survey Scores with SAM Users Database |
| CAMUSER_AS(N)CODE | Registers Users Alternative Survey Scores with CAM Users Database |
| DCSUSER_AS(N)CODE | Registers Users Alternative Survey Scores with Dynamic Content Server |
| DVSUSER_AS(N)CODE | Registers Users Alternative Survey Scores with Dynamic Video Server |
| Package 4 | |
| RUSER_S(N)CODE | The survey identification that the registered user completed |
| RUSER_PA1CODE | Stores & Process the answers to the personality survey |
| RUSER_PA2CODE | Stores & Process the answers to the personality survey |
| RUSER_PA3CODE | Stores & Process the answers to the personality survey |
| RUSER_PA4CODE | Stores & Process the answers to the personality survey |
| RUSER_PA5CODE | Stores & Process the answers to the personality survey |
| RUSER_PA6CODE | Stores & Process the answers to the personality survey |
| RUSER_PA7C0DE | Stores & Process the answers to the personality survey |
| RUSER_PA8CODE | Stores & Process the answers to the personality survey |
| PRSN_S(N)_CODE | Registered the users personality type with corresponding database |
| PRSN_S(N)CODE | Registered the users personality type with corresponding database |
| SAMUSER_TPRSN | Identify the SAM User Target Personality Type |
| CAMUSER_TPRSN | Identify the CAM User Target Personality Type |

TABLE 1-continued

| | |
|---|---|
| DCSUSER_TPRSN | Identify the DCS User Target Personality Type |
| DVSUSER_TPRSN | Identify the DVS User Target Personalty Type |
| Package 5 | |
| | |
| RUSER_DCS_IDCODE | Registers Dynamic Content Server with Register's User's Database |
| SAMUSER_DCS_IDCODE | Registers Dynamic Content Server with SAM User's Database |
| CAMUSER_DCF_IDCODE | Registers Dynamic Content Feed with CAM User's Database |
| CAMUSER_DCS_IDCODE | Registers Dynamic Content Server with CAM User's Database |
| DCSUSER_DCF_IDCODE | Registers Dynamic Content Server Dynamic Content Feeds with Databases |
| DCSUSER_N100 | Stores and Processes Dynamic Content that corresponds to N100 Entity |
| DCSUSER_E100 | Stores and Processes Dynamic Content that corresponds to E100 Entity |
| DCSUSER_S100 | Stores and Processes Dynamic Content that corresponds to S100 Entity |
| DCSUSER_F100 | Stores and Processes Dynamic Content that corresponds to F100 Entity |
| DCSUSER_L100 | Stores and Processes Dynamic Content that corresponds to L100 Entity |
| DCSUSER_M100 | Stores and Processes Dynamic Content that corresponds to M100 Entity |
| DCSUSER_H100 | Stores and Processes Dynamic Content that corresponds to H100 Entity |
| DCSUSER_R100 | Stores and Processes Dynamic Content that corresponds to R100 Entity |
| DCSCLD(N)_CODE | Stores and Processes Dynamic Content that corresponds to CLD Entity |
| Package 6 | |
| | |
| RUSER_DVS_IDCODE | Registers Dynamic Video Server with Register's User's Database |
| SAMUSER_DVS_IDCODE | Registers Dynamic Video Server with SAM User's Database |
| CAMUSER_DVS_IDCODE | Registers Dynamic Video Server with CAM User's Database |
| DVSUSER_DVS_IDCODE | Registers Dynamic Content Server Dynamic Video Server with Databases |
| DVSUSER_N100 | Stores and Processes Dynamic Video that corresponds to N100 Entity |
| DVSUSER_E100 | Stores and Processes Dynamic Video that corresponds to E100 Entity |
| DVSUSER_S100 | Stores and Processes Dynamic Video that corresponds to S100 Entity |
| DVSUSER_F100 | Stores and Processes Dynamic Video that corresponds to F100 Entity |
| DVSUSER_L100 | Stores and Processes Dynamic Video that corresponds to L100 Entity |
| DVSUSER_M100 | Stores and Processes Dynamic Video that corresponds to M100 Entity |
| DVSUSER_H100 | Stores and Processes Dynamic Video that corresponds to H100 Entty |
| DVSUSER_R100 | Stores and Processes Dynamic Video that corresponds to R100 Entity |
| DVSLHOST_CODE | Stores and Processes Dynamic Video that corresponds to Live Host Entity |
| DVSDPID_CODE | Stores and Processes Dynamic Video that corresponds to Interactive Presentation |
| Package 7 | |
| | |
| RUSER_IRFCODE | Registers, Stores and Process Registered User's Item Response Functions |
| SAMUSER_IRFCODE | Stores and Process Register Users Item Response Functions in the SAM Database |
| CAMUSER_IRFCODE | Stores and Process Register Users Item Response Functions with CAM Database |
| DCSUSER_IRFCODE | Stores and Process Register Users Item Response Functions with DCS Database |
| DVSUSER_IRFCODE | Stores and Process Register Users Item Response Functions with DVS Database |
| Package 8 | |
| | |
| RUSER_AISS | Registers, Stores and Process Registered User's AISS |
| RUSER_ASSOCIATION | Stores and Process Register User's AISS Information for Associations with databases |
| RSAM_ASSOCIATION | Stores and Process SAM User's AISS Information for Associations with databases |
| RCAM_ASSOCIATION | Stores and Process CAM User's AISS Information for Associations with databases |
| SAM_AISS | Register, Stores and Process SAM User's AISS |
| CAM_AISS | Register, Stores and Process CAM User's AISS |

PIRI INTELLIGENT APPLICATION INTERFACE (API)

The PIRI INTELLIGENT API (108,115, 125) connects to multiple databases, handle errors, and process data requests, execute SQL commands, bind input parameters, execute queries and fetch result sets. The PIRI INTELLIGENT API also allows the binding of LongBinary, LongChar, BLob and CLob data, as well as the Fetching of LongBinary, LongChar, BLob and CLob data and enables Multithreading support and canceling queries.

The PIRI INTELLIGENT API uses a C# language library to process data and information that the Present Invention relies upon. The PIRI INTELLIGENT API acts as middleware and provides database portability which allows developers and persons skilled in the art to create scripts that processes the data contained in the databases explained in this application using programming languages that is native to Oracle Database Server, Microsoft SQL Server, Sybase, DB2, Informix, InterBase/Firebird, Centura, MySQL, PostgreSQL, ODBC, SQLite.

The PIRI INTELLIGENT API contains a library of algorithms that use Item Response Functions to monitor, track, process, and suggest content to users as well as provide content suggestions regarding the specific nature of content that is targeted to users. The programming contained in this explanation can be achieved using the PIRI INTELLIGENT API to process SQL Queries and Statements within each respective Relational Database Management System (RDMS).

For the sake of explanation, and open connectivity of the Databases, the features, processes, routines, functions and sub-functions, as well as queries, statements and other methods and processes are programmed using scripts contained within the PIRI INTELLIGENT API.

A person skilled in the art would be able to use the PIRI INTELLIGENT API to program the unique operations and novel methods of the instant invention using C# language to implement database queries. Note—while the programming skill required is within the skill of a person of ordinary skill in the art, the present invention presents unique operations and novel non-obvious methods for dynamic content distribution.

The Dynamic Content Server, (122) uses the data sets as shown in FIG. 10 and the Content Management System Entity (1000). This data is called tabular data and is mapped to a HTML webpage that is encoded with CSS Containers and Frames. The CSS Containers and Frames receives content feeds from the corresponding UML Class Attributes such as the ones displayed in Entity (1000).

As shown in FIG. 10, entities (1001), (1002), and (1003) exchanges content information with entity (1000) the Registered User's Content Management System. The Registered SAM RDMS entity (1001) uses the content information to determine what type of content should be associated with the Subscriber. The Registered CAM RDMS entity (1002) uses the content information as aide for the Content Provider to determine where the content type should be posted. The Dynamic Content Server entity (1003) stores information regarding the menu, submenu, category, page and type of content that is displayed. The Dynamic Content Server entity (1003) also relies on the users Item Response Functions to suggest content to the Registered User.

The Dynamic Video Server, uses the data shown in FIG. 10, the Video Management System Entity (1004). This data is called tabular data and is mapped to a HTML webpage that is encoded with a Multimedia Player or the video is embedded in a HTML webpage using CSS Containers and Frames. The Multimedia Player, CSS Containers, and Frames, receives content feeds from the corresponding UML Class Attributes such as the ones displayed in Entity (1004).

As shown in FIG. 10 entities (1004), (1005), and (1006) exchanges content information with entity (1004) the Registered User's Video Management System. The Registered SAM RDMS entity (1005) uses the content information to determine what type of content should be associated with the Subscriber. The Registered CAM RDMS entity (1006) uses the video content information as aide for the Content Provider to determine where the content type should be posted. The Dynamic Video Server entity (1007) stores information regarding the menu, submenu, category, page and type of content that is displayed. The Dynamic Video Server entity (1007) also relies on the users Item Response Functions to suggest content to the Registered User.

FIG. 11 illustration depicts another embodiment using the present invention installed directly on hardware as a software application, separate and distinct from the browser plug-in embodiment. In this scenario, the Software Application follows the same installation principles that requires user's to register and complete a survey that identifies the User's Registered Psychometric Profile.

FIG. 11. television (1100) is equipped with an HDMI interface. Mini-PC (1101) is also equipped with an HDMI interface and Wi-Fi connections (1102, 1103, and 1104) form a Virtual Private Network (VPN) that allows the User to control and display content on television (1100) wherein the content is provided by UMPC Ultra-Mobile Personal Computer Device (1105) which is similar to an IPAD. Once the VPN connection is made, the UMPC device (1105) displays information in real time on the television (1100) via host Mini-PC (1101) which enables the UMPC device (1105) to function as a Remote or Command station for the television (1100).

In FIG. 11 the Dynamic Content Distribution System Software Application of the present invention is installed on the UMPC (1105). The User registers and completes the survey as required by the installation program. The relational database management systems, the registers, the IRF functions, the MetaDerms, the User's AIS Score, and the Content Management Server all cooperate together to configure and deliver the dynamic content based on the Registered User's attributes.

After this automatic configuration process is complete such as during normal usage, when the user logs into the VPN Connection a remote desktop exchange is created between the handheld UMPC and the Television Set that has a Mini-Pc attached. When the user starts up the Dynamic Content Distribution System Application on the UMPC, the identical application is displayed on the television. As the user moves icons, and or select programs during normal usage, the information is displayed on the television.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A dynamic content distribution method wherein an item response function (IRF) suggests content to end-users based on psychometric reasoning;
   wherein the content is provided by a relational database management system which stores content and the content is categorized according to psychometric attributes according to predetermined psychological measurement categories wherein the categories include the measurement of knowledge, abilities, attitudes, and personality traits.

2. The method of claim 1 wherein the content is video.

3. The method of claim 2 further including a subscriber wherein:
   a unique Alpha Numerical Identification Sequential Score (AIS Score) identifies an end-user based at least in part on end-user input data,
   the AIS Score further identifying an end-user's database repository where the AIS Score information is stored, the end-user's social demographics, the end-user's Primary and Secondary Personality traits, an Item Response Identification Code, and the end-user's registration code wherein these elements combine to form the end-user's Personality AIS Score.

4. The method of claim 2 wherein:
   a unique Subscriber Assigned Metaderm (SAM) number identifies the attributes of a subscriber affiliate relationship associated with a subscriber's category associated with the subscriber, a subscriber's database repository associated with the subscriber, a subscriber's company code associated with the subscriber, a subscriber's personality traits associated with the subscriber, and a subscriber's registration code associated with the subscriber.

5. The method of claim 4 wherein the subscriber's SAM number is used in connection with the relational database management system to identify the attributes of the subscriber that are associated to the end-user's Personality AIS Score,
   wherein the subscriber is accredited with endorsing the suggested content with correlates between the subscriber's SAM number and the end-user's Personality AIS Score.

6. The method of claim 5 wherein a subscriber SAM number to end-user's Personality AIS Score affiliation is formed when the subscriber SAM number is assigned to a public personality (such as a music recording artist, actor, actress, politician) matching an end-user's Personality AIS Score, and the public personality endorses the content that is suggested to the end-users whose Personality AIS Scores matched the subscriber's SAM number,
   wherein the affiliation creates compensatory relationship where the affiliate is eligible to receive some form of compensation for the endorsement.

7. The method of claim 1 wherein a unique Content Assigned Metaderm (CAM) number is used to identify what type of content is suggested or distributed to the end-user, and wherein the content is presented within an end-user's content management system whereas the content management system represents the user's start page within a web browser, or the user's Graphical User Interface within a stand alone software application.

8. The method of claim 7 wherein the CAM number further identifies a menu category where the content is sent, a sub-menu-and table location, a page identification number to which end-user primary and secondary personality traits will be distributed, a database repository in which the content is stored, and a content provider unique registration code.

9. The method of claim 7 wherein the end-user's Personality AIS Score is associated with the subscriber SAM number and both are registered and associated with the CAM number and collectively the distribution of content depends on this interconnected relationship.

10. The method of claim 1 wherein end-users are required to complete a registration survey including psychometric tests that determine the end-user's personality traits and, if required, components of a software/web browser plug-in are installed based on the end-user's personality traits.

11. The method of claim 10 wherein the user's personality traits and how the end-user responses to content that is suggested or distributed to the end-user based on the end-user's personality traits is used to suggest additional psychometric tests which are used to further characterize the end-user's psychometric attributes.

12. The method of claim 1 wherein dynamic video content is suggested or distributed to the end-user using video footage and recording segments of a live person as a host, wherein the host suggests to the end-user how to use the dynamic content distribution method and further the host explains categories within the dynamic content distribution methodology.

13. The method of claim 11 wherein a live person host is used to make suggestions based on an end-user's Personality AIS Score developed from initial data input by the end-user and additional psychometric attributes developed from data subsequently input by the end-user after the initial data was input,
wherein the live person host is referred to as an interactive lifestyle coach.

14. The method of claim 1 wherein the suggested content is presented using a UMPC (ultra-mobile personal computer) and a mini-pc connected to an HDMI equipped LCD television and the combination is linked together using a Virtual Private Network that displays the content of the UMPC on the television via the VPN wherein the end-user can control the application on the television using the UMPC.

* * * * *